United States Patent
Fujita et al.

(10) Patent No.: US 6,794,461 B2
(45) Date of Patent: Sep. 21, 2004

(54) METHOD FOR PURIFICATION OF VINYL POLYMERS

(75) Inventors: Nao Fujita, Osaka (JP); Kenichi Kitano, Osaka (JP); Yoshiki Nakagawa, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/938,310

(22) Filed: Aug. 24, 2001

(65) Prior Publication Data

US 2002/0132930 A1 Sep. 19, 2002

(30) Foreign Application Priority Data

Aug. 25, 2000 (JP) ........................................ 2000-254841
Aug. 25, 2000 (JP) ........................................ 2000-254842

(51) Int. Cl.$^7$ .................................................. C08F 8/14
(52) U.S. Cl. .................... 525/330.4; 525/386; 525/388; 528/483
(58) Field of Search .............................. 525/330.4, 388, 525/386; 528/483

(56) References Cited

U.S. PATENT DOCUMENTS

| 3,826,780 | A | | 7/1974 | Kiss et al. |
| 4,452,950 | A | | 6/1984 | Wideman |
| 6,265,489 | B1 | * | 7/2001 | Barkac et al. ............... 525/119 |
| 6,274,688 | B1 | * | 8/2001 | Nakagawa et al. ...... 526/329.7 |
| 6,348,554 | B1 | * | 2/2002 | Roos et al. .................. 526/319 |

FOREIGN PATENT DOCUMENTS

| DE | 196 17 230 A1 | 11/1997 |
| EP | 0 490 672 A2 | 6/1992 |
| EP | 0 522 375 A1 | 1/1993 |
| EP | 0 714 917 A2 | 6/1996 |
| EP | 0 808 850 A1 | 11/1997 |
| FR | 2 152 875 A | 4/1973 |
| WO | WO 92 17512 A | 10/1992 |
| WO | WO 98 01480 A | 1/1998 |
| WO | WO 01 40317 A | 6/2001 |

* cited by examiner

*Primary Examiner*—Bernard Lipman
(74) *Attorney, Agent, or Firm*—Armstrong, Kratz, Quintos, Hanson & Brooks, LLP

(57) ABSTRACT

This invention provides a method for purification of a vinyl polymer
  which comprises the atom transfer radical polymerization of a vinyl monomer using a transition metal complex as the polymerization catalyst,
  said vinyl polymer being brought into contact with an oxidizing agent or a reducing agent.

11 Claims, No Drawings

METHOD FOR PURIFICATION OF VINYL POLYMERS

FIELD OF THE INVENTION

The present invention relates to a method for purification of vinyl polymers, vinyl polymers, hydrosilylatable compositions, and curable compositions.

PRIOR ART

The hydrosilylation reaction is used for functional group transformation or crosslinking, for instance, and as such is one of reactions of great industrial importance. By way of illustration, it is known that a polymer having an alkenyl functional group at its molecular chain terminus undergoes crosslinking in the presence of a hydrosilyl group-containing compound as a curing agent to give a cured product of good heat resistance and durability and that the reaction of such an alkenyl group-terminated polymer with a crosslinkable silyl group-containing hydrosilyl compound gives a crosslinkable silyl group-terminated polymer. While such a hydrosilylation reaction proceeds under heating, a hydrosilylation catalyst is generally added for accelerating the reaction. As examples of said hydrosilylation catalyst, radical initiators, such as organic peroxides and azo compounds, and transition metal catalysts can be mentioned. It is known that particularly when a transition metal catalyst is used, the hydrosilylation reaction can be promptly carried to completion with no more than the so-called catalyst amount of the catalyst.

Meanwhile, as a technology for precision synthesis of polymers, the living polymerization method is generally known. Living polymerization not only provides for effective control of molecular weight and molecular weight distribution but gives a polymer with a definite terminal structure. Therefore, living polymerization can be cited as an effective method for introduction of a functional group into the polymer chain terminus. Recently polymerization systems suited to living polymerization have been discovered in the field of radical polymerization as well and studies on living radical polymerization are have been undertaken with a great enthusiasm. Particularly by utilizing the atom transfer radical polymerization technique, a vinyl polymer with a narrow molecular weight distribution can be obtained. As an example of the atom transfer radical polymerization technique, there can be mentioned a polymerization system using an organohalogen compound or a halogenated sulfonyl compound as the initiator and a metal complex the center metal of which is an element of group 8, group 9, group 10 or group 11 of the periodic table of the elements as a catalyst [e.g. Matyjaszewski et al., J. Am. Chem. Soc. 1995, 117, 5614, Macromolecules 1995, 28, 7901, Science 1996, 272, 866 or Sawamoto et al., Macromolecules 1995, 28, 1721].

However, the vinyl polymer produced by atom transfer radical polymerization contains residues of the transition metal complex used as the polymerization catalyst, so that troubles such as discoloration and adverse effects on physical properties of the product polymer as well as environmental safety problems are at times encountered. Taking an alkenyl group-terminated vinyl polymer produced by utilizing said atom transfer radical polymerization technique as an example, the residual catalyst acts as a catalyst poison in hydrosilylation to interfere with the hydrosilylation reaction so that the expensive transition metal catalyst has to be used in a substantial amount.

The inventors of the present invention discovered that an increased hydrosilylation activity could be assured by contacting the vinyl polymer obtainable by atom transfer radical polymerization with an adsorbent for purification (Japanese Kokai Publication Hei-11-193307). However, this practice tends to require a large quantity of the adsorbent entailing an increased burden on the environment associated with the subsequent disposal of the adsorbent and an increased production cost. The present invention overcomes the above problems and provides an economical and efficient method for purification of vinyl polymers, hydrosilylatable polymers and relevant compositions.

SUMMARY OF THE INVENTION (1) The present invention is concerned with a method for purification of a vinyl polymer obtainable by the atom transfer radical polymerization of a vinyl monomer using a transition metal complex as a polymerization catalyst, wherein an oxidizing agent or a reducing agent is used.

(2) The invention is further concerned with a method for purification of a vinyl polymer having at least one alkenyl group per molecule or an intermediate obtainable in the course of production of said vinyl polymer, wherein an oxidizing agent or a reducing agent is used.

(3) The invention is further concerned with a purification method wherein said vinyl polymer having at least one alkenyl group per molecule is obtainable by the atom transfer radical polymerization of a vinyl monomer using a transition metal complex as a polymerization catalyst.

(4) The invention is further concerned with a method for purification of a vinyl polymer for use as a component constituting a hydrosilylatable composition, wherein the use of an oxidizing agent or a reducing agent is used.

(5) The invention is further concerned with a vinyl polymer obtainable by any of the above purification methods (1) to (4) and a hydrosilylatable composition comprising said polymer.

(6) The invention is further concerned with a curable composition comprising (A) an alkenyl group-containing vinyl polymer obtainable by any of the above purification methods (1) to (4) and (B) a compound containing at least 1.1 hydrosilyl groups per molecule.

(7) The invention is further concerned with a crosslinkable silyl group-containing vinyl polymer obtainable by subjecting an alkenyl group-containing vinyl polymer obtainable by any of said purification methods (1) to (4) and a hydrosilyl group-containing compound additionally having a crosslinkable silyl group to hydrosilylation reaction.

(8) The invention is further concerned with a curable composition comprising said crosslinkable silyl group-containing vinyl polymer.

DETAILED DESCRIPTION OF THE INVENTION

The present invention relates to a method for purification of a vinyl polymer obtainable by the atom transfer radical polymerization of a vinyl monomer using a transition metal complex as a polymerization catalyst, which comprises bringing said the vinyl polymer into contacted with an oxidizing agent or a reducing agent. It should, however, be understood that the vinyl polymer to be purified is not limited to one produced by atom transfer radical polymerization but may be a vinyl polymer obtainable by any other production method.

Atom Transfer Radical Polymerization

To begin with, atom transfer radical polymerization is described in detail. The term "atom transfer radical polymerization" as used in this specification means a mode of living radical polymerization in which a vinyl monomer is radical-polymerized using an organohalogen compound or a halogenated sulfonyl compound as an initiator and a metal complex the center metal of which is a transition metal as a catalyst. For information on specific relevant techniques, reference may be had to Matyjaszewski et al., J. Am. Chem. Soc. 117, 5614 (1995); Macromolecules 28, 7901 (1995); Science 272, 866 (1996), WO 96/30421, Wo 97/18247, WO 98/01480, WO 98/40415, Sawamoto et al., Macromolecules 28, 1721 (1995), Japanese Kokai Publication Hei-9-208616 and Japanese Kokai Publication Hei-8-41117, among others publications.

Atom transfer radical polymerization in the context of the present invention includes the so-called reverse atom transfer radical polymerization. Reverse atom transfer radical polymerization is a technology such that an ordinary radical initiator such as a peroxide is caused to act e.g. Cu (II), in the case of using Cu (I) as the catalyst, to thereby establish an equilibrium state similar to that prevailing in standard atom transfer radical polymerization when an ordinary atom transfer radical polymerization catalyst has liberated a radical and come into a highly oxidized state (cf. Macromolecules 32, 2872 (1999).

In this atom transfer radical polymerization, an organohalogen compound, particularly an organohalogen compound having a highly reactive carbon-halogen bond (e.g. a carbonyl compound having a halogen atom in the α-position or a compound having a halogen atom in the benzyl position), or a halogenated sulfonyl compound, for instance, is used as the initiator. Specifically, compounds represented by the formulas:

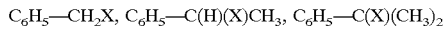

$C_6H_5$—$CH_2X$, $C_6H_5$—$C(H)(X)CH_3$, $C_6H_5$—$C(X)(CH_3)_2$ (wherein $C_6H_5$ means phenyl; X represents chlorine, bromine or iodine),

$R^3$—$C(H)(X)$—$CO_2R^4$, $R^3$—$C(CH_3)(X)$—$CO_2R^4$, $R^3$—$C(H)(X)$—$C(O)R^4$, $C(CH_3)(X)$—$C(O)R^4$ (in the above formulas, $R^3$ and $R^4$ each represents a hydrogen atom or an $C_{1-2}$ alkyl, aryl or aralkyl group; X represents chlorine, bromine or iodine), and

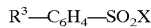

$R^3$—$C_6H_4$—$SO_2X$ (wherein $R^3$ represents a hydrogen atom or a $C_{1-2}$ alkyl, aryl or aralkyl group; X represents chlorine, bromine or iodine) can be mentioned by way of example.

The atom transfer radical polymerization of a vinyl monomer using said organohalogen compound or halogenated sulfonyl compound as an initiator gives a vinyl polymer having the terminal structure represented by the following general formula (1):

—$C(R^1)(R^2)(X)$          (1)

(wherein $R^1$ and $R^2$ each represents a group bonded to the ethylenically unsaturated group of a vinyl monomer; X represents chlorine, bromine or iodine).

As the initiator for atom transfer radical polymerization, an organohalogen compound or halogenated sulfonyl compound having both a functional group involved in the initiation of polymerization and a certain reactive functional group not involved in the initiation of polymerization may be employed. In that case, the product polymer is a vinyl polymer having said reactive functional group at one terminus of its molecular chain and the terminal structure of the general formula (1) at the other terminus thereof. As examples of the reactive functional group, there can be mentioned alkenyl, crosslinkable silyl, hydroxyl, epoxy, amino and amido, among others. By utilizing the reactivity of such reactive functional group, an optional other suitable functional group can be introduced into the vinyl polymer via one or more reaction steps.

The organohalogen compound having an alkenyl group is not particularly restricted but includes compounds having a structure of the following general formula (2):

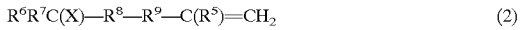

$R^6R^7C(X)$—$R^8$—$R^9$—$C(R^5)$=$CH_2$          (2)

(wherein $R^5$ represents hydrogen or methyl; $R^6$ and $R^7$ each represents hydrogen or a $C_{1-20}$ alkyl, aryl or aralkyl group which is either univalent or those joined to the other through the free terminus; $R^8$ represents —C(O)O— (ester group), —C(O)— (keto group) or an o-, m-, or p-phenylene group; $R^9$ represents a direct bond or a bivalent organic group of 1 to 20 carbon atoms which may optionally contain one or more ether bonds; X represents chlorine, bromine or iodine)

The substituents $R^6$ and $R^7$ specifically include hydrogen, methyl, ethyl, n-propyl, isopropyl, butyl, pentyl and hexyl, among others. $R^6$ and $R^7$ may be bonded through the respective free termini to form a cyclic structure.

The alkenyl group-containing organohalogen compound of the general formula (2) includes such species as: $XCH_2C(O)O(CH_2)_nCH$=$CH_2$, $H_3CC(H)(X)C(O)O(CH_2)_nCH$=$CH_2$, $(H_3C)_2C(X)C(O)O(CH_2)_nCH$=$CH_2$, $CH_3CH_2C(H)(X)C(O)O(CH_2)$, $CH$=$CH_2$,

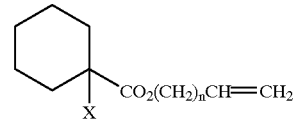

(in the above formulas, X represents chlorine, bromine or iodine; n represents an integer of 1 to 20) $XCH_2C(O)O(CH_2)_nO(CH_2)_mCH$=$CH_2$, $H_3CC(H)(X)C(O)O(CH_2)_nO(CH_2)$ $CH$=$CH_2$, $(H_3C)_2C(X)C(O)O(CH_2)_nO(CH_2)_mCH$=$CH_2$, $CH_3CH_2C(H)(X)C(O)O(CH_2)_nO(CH_2)_nCH$=$CH_2$,

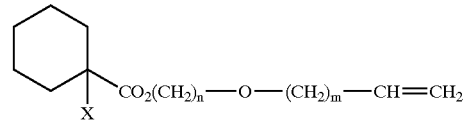

(in the above formulas, X represents chlorine, bromine or iodine; n represents an integer of 1 to 20; m represents an integer of 0 to 20)

o, m, p-$XCH_2$—$C_6H_4$—$(CH_2)_n$—$CH$=$CH_2$, o, m, p-$CH_3C(H)(X)$—$C_6H_4$—$(CH_2)_n$—$CH$=$CH_2$, o, m, p-$CH_3CH_2C(H)(X)$—$C_6H_4$—$(CH_2)_n$—$CH$=$CH_2$, (in the above formulas, X represents chloride, bromine or iodine; n represents an integer of 0 to 20)

o, m, p-$XCH_2$—$C_6H_4$—$(CH_2)_n$—O—$(CH_2)_m$—$CH$=$CH_2$, o, m, p-$CH_3C(H)(X)$—$C_6H_4$—$(CH_2)_n$—O—$(CH_2)_n$—$CH$=$CH_2$, o, m, p-$CH_3CH_2C(H)(X)$—$C_6H_4$—$(CH_2)_n$—O—$(CH_2)_m$—$CH$=$CH_2$, (in the above formulas, X represents chlorine, bromine or iodine; n represents an integer of 1 to 20; m represents an integer of 0 to 20)

o, m, p-$XCH_2$—$C_6H_4$—O—$(CH_2)_n$—$CH$=$CH_2$, o, m, p-$CH_3C(H)(X)$—$C_6H_4$—O—$(CH_2)_n$—$CH$=$CH_2$, o, m, p-$CH_3CH_2C(H)(X)$—$C_6H_4$—O—$(CH_2)_n$—$CH$=$CH_2$, (in the above formulas, X represents chlorine, bromine or iodine; n represents an integer of 0 to 20)

o, m, p-XCH$_2$—C$_6$H$_4$—O—(CH$_2$)$_n$—O—(CH$_2$)$_m$—CH=CH$_2$, o, m, p-CH$_3$C(H)(X)—C$_6$H$_4$—O—(CH$_2$)$_n$—O—(CH$_2$)$_m$—CH=CH$_2$, o, m, p-CH$_3$CH$_2$C(H)(X)—C$_6$H$_4$—O—(CH$_2$)$_n$—O—(CH$_2$)$_m$—CH=CH$_2$, (In the above formulas, X represents chlorine, bromine or iodine; n represents an integer of 1 to 20; m represents an integer of 0 to 20)

As the alkenyl group-containing organohalogen compound, compounds of the general formula (3) can also be mentioned.

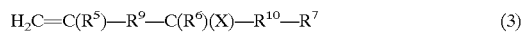

$$H_2C=C(R^5)-R^9-C(R^6)(X)-R^{10}-R^7 \quad (3)$$

(wherein R$^5$, R$^6$, R R$^9$ and X are respectively as defined hereinbefore; R$^{10}$ represents a direct bond, —C(O)O— (ester group), —C(O)— (keto group) or an o-, m-, or p-phenylene group)

R$^8$ represents a direct bond or a bivalent organic group of 1 to 20 carbon atoms (optionally containing 1 or more ether bonds). When it is a direct bond, the vinyl group is bound to the carbon atom bonded to the halogen atom, that is to say the compound is an allyl halide. In this case, the carbon-halogen bond is activated by the adjacent vinyl group and, therefore, R$^{10}$ need not necessarily be a C(O)O group, a phenylene group or the like but may be a direct bond. When R$^9$ is not a direct bond, R$^{10}$ is preferably a C(O)O group, a C(O) group or a phenylene group in order that the carbon-halogen bond may be activated. Preferably R$^{10}$ represents a C(O)O group, a C(O) group or a phenylene group.

A specific example of the compound of the general formula (3) includes the following species:
CH$_2$=CHCH$_2$X, CH$_2$—C(CH$_3$)CH$_2$X, CH$_2$=CHC(H)(X)CH$_3$, CH$_2$=C(CH$_3$)C(H)(X)CH$_3$, CH$_2$=CHC(X)(CH$_3$)$_2$, CH$_2$=CHC(H)(X)C$_2$H$_5$, CH$_2$=CHC(H)(X)CH(CH$_3$)$_2$, CH$_2$=CHC(H)(X)C$_6$H$_5$, CH$_2$=CHC(H)(X)CH$_2$C$_6$H$_5$, CH$_2$=CHCH$_2$C(H)(X)—CO$_2$R, CH$_2$=CH(CH$_2$)$_2$C(H)(X)—CO$_2$R, CH$_2$=CH(CH$_2$)$_3$C(H)(X)—CO$_2$R, CH$_2$=CH(CH$_2$)$_8$C(H)(X) —CO$_2$R, CH$_2$=CHCH$_2$C(H)(X)—C$_6$H$_5$, CH$_2$=CH(CH$_2$)$_2$C(H)(X)—C$_6$H$_5$ and CH$_2$=CH(CH$_2$)$_3$C(H)(X)—C$_6$H$_5$ (in the above formulas, X represents chlorine, bromine or iodine; R represents a C$_{1-20}$ alkyl, aryl or aralkyl group)

A specific example of the alkenyl group-containing halogenated sulfonyl compound mentioned above includes:
o-, m-, p-CH$_2$=CH—(CH$_2$)$_n$—C$_6$H$_4$—SO$_2$X and o-, m-, p-CH$_2$=CH—(CH$_2$)$_n$—O—C$_6$H$_4$—SO$_2$X (in the above formulas, X represents chlorine, bromine or iodine; n represents an integer of 0 to 20)

The crosslinkable silyl group-containing organohalogen compound mentioned above is not particularly restricted but includes compounds having a structure represented by the general formula (4), for instance.

$$R^6R^7C(X)-R^8-R^9-C(H)(R^5)CH_2-[Si(R^{11})_{2-b}(Y)_bO]_m-Si(R^{12})_{3-a}(Y)_a \quad (4)$$

(wherein R$^5$, R$^6$, R$^7$, R$^8$, R$^9$ and X are respectively as defined hereinbefore; R$^{11}$ and R$^{12}$ each represents a C$_{1-20}$ alkyl, aryl or aralkyl group or a triorganosiloxy group of the formula (R')$_3$SiO— (where R' represents a univalent hydrocarbon group of 1 to 20 carbon atoms and the plurality of R' groups may be the same or different) and two or more of R$^{11}$ and R$^{12}$ may be the same or different; Y represents a hydroxyl group or a hydrolyzable group and two or more of Y groups, if it is the case, may be the same or different; a represents 0, 1, 2 or 3; b represents 0, 1 or 2; m represents an integer of 0 to 19; provided, however, that the relation a+mb≧1 should be satisfied)

A specific example of the compound of the general formula (4) includes the following species:
XCH$_2$C(O)O(CH$_2$)$_n$Si(OCH$_3$)$_3$, CH$_3$C(H)(X)C(O)O(CH$_2$)$_n$Si(OCH$_3$)$_3$, (CH$_3$)$_2$C(H)C(O)O(CH$_2$)$_n$Si(OCH$_3$)$_3$, XCH$_2$C(O)O(CH$_2$)$_n$Si(CH$_3$)(OCH$_3$)$_2$, CH$_3$C(H)(X)C(O)O(CH$_2$)$_n$Si(CH$_3$)(OCH$_3$)$_2$, (CH$_3$)$_2$C(X)C(O)O(CH$_2$)$_n$Si(CH$_3$)(OCH$_3$)$_2$, (in each of the above formulas, X represents chlorine, bromine or iodine; n represents an integer of 0 to 20)
XCH$_2$C(O)O(CH$_2$)$_n$O(CH$_2$)$_m$Si(OCH$_3$)$_3$, H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$, CH$_3$CH$_2$C(H)(X)C(O)O(CH$_2$)$_n$O(CH$_2$)$_m$Si(OCH$_3$)$_3$, XCH$_2$C(O)O(CH$_2$)$_n$O(CH$_2$)$_m$Si(CH$_3$)(OCH$_3$)$_2$, H$_3$CC(H)(X)C(O)O(CH$_2$)$_n$O(CH$_2$)$_m$Si(CH$_3$)(OCH$_3$)$_2$, (H$_3$C)$_2$C(X)C(O)O(CH$_2$)$_n$(CH$_2$)$_m$Si(CH$_3$)(OCH$_3$)$_2$, CH$_3$CH$_2$C(H)(X)C(O)O(CH$_2$)$_n$O(CH$_2$)$_m$Si(CH$_3$)(OCH$_3$)$_2$, (in each of the above formulas, X represents chlorine, bromine or iodine; n represents an integer of 1 to 20; m represents an integer of 0 to 20)
o, m, p-XCH$_2$—C$_6$H$_4$—(CH$_2$)$_2$Si(OCH$_3$)$_3$, o, m, p-OH$_3$C(H)(X)—C$_6$H$_4$—(CH$_2$)$_2$Si(OCH$_3$)$_3$, o, m, p-CH$_3$CH$_2$C(H)(X)—C$_6$H$_4$—(CH$_2$)$_2$Si(OCH$_3$)$_3$, o, m, p-XCH$_2$—C$_6$H$_4$—(CH$_2$)$_3$Si(OCH$_3$)$_3$, o, m, p-CH$_3$C(H)(X)—C$_6$H$_4$—(CH$_2$)$_3$Si(OCH$_3$)$_3$, o, m, p-CH$_3$CH$_2$C(H)(X)—C$_6$H$_4$—(CH$_2$)$_3$Si(OCH$_3$)$_3$, o, m, p-XCH$_2$—C$_6$H$_4$—(CH$_2$)$_2$—O—(CH$_2$)$_3$Si(OCH$_3$)$_3$, o, m, p-CH$_3$C(H)(X)—C$_6$H$_4$—(CH$_2$)$_2$—O—(CH$_2$)$_3$Si(OCH$_3$)$_3$, o, m, p-CH$_3$CH$_2$C(H)(X)—C$_6$H$_4$—(CH$_2$)$_2$—O—(CH$_2$)$_3$Si(OCH$_3$)$_3$, o, m, p-XCH$_2$—C$_6$H$_4$—O—(CH$_2$)$_3$Si(OCH$_3$)$_3$, o, m, p-CH$_3$C(H)(X)—C$_6$H$_4$—O—(CH$_2$)$_3$Si(CH$_3$)$_3$, o, m, p-CH$_3$CH$_2$C(H)(X)—C$_6$H$_4$—O—(CH$_2$)$_3$Si(OCH$_3$)$_3$, o, m, p-XCH$_2$—C$_6$H$_4$—O—(CH$_2$)$_2$—O—(CH$_2$)$_3$Si(OCH$_3$)$_3$, o, m, p-CH$_3$C(H)(X)—C$_6$H$_4$—O—(CH$_2$)$_2$—O—(CH$_2$)$_3$Si(OCH$_3$)$_3$ and o, m, p-CH$_3$CH$_2$C(H)(X)—C$_6$H$_4$—O—(CH$_2$)$_2$—O—(CH$_2$)$_3$Si(OCH$_3$)$_3$, (in each of the above formulas, X represents chlorine, bromine or iodine)

A specific example of the crosslinkable silyl group-containing organohalogen compound further includes the compound having a structure represented by the following general formula (5).

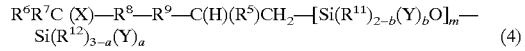

$$(R^{12})_{3-a}(Y)_aSi-[OSi(R^{11})_{2-b}(Y)_b]_m-CH_2-C(H)(R^5)-R^9-C(R^6)(X)-R^{10}-R^7 \quad (5)$$

(wherein R$^5$, R$^7$, R$^8$, R$^9$, R$^{10}$, R$^{11}$, R$^{12}$, a, b, m, X and Y are respectively as defined hereinbefore)

A specific example of this compound includes the following species:
(CH$_3$O)$_3$SiCH$_2$CH$_2$C(H)(X)C$_6$H$_5$, (CH$_3$O)$_2$(CH$_3$)SiCH$_2$CH$_2$C(H)(X)C$_6$H$_5$, (CH$_3$O)$_3$Si(CH$_2$)$_2$C(H)(X)—CO$_2$R, (CH$_3$O)$_2$(CH$_3$)Si(CH$_2$)$_2$C(H)(X)—CO$_2$R, (CH$_3$O)$_3$Si(CH$_2$)$_3$C(H)(X)—CO$_2$R, (CH$_3$O)$_2$(CH$_3$)Si(CH$_2$)$_3$C(H)(X)—CO$_2$R, (CH$_3$O)$_3$Si(CH$_2$)$_4$C(H)(X)—CO$_2$R, (CH$_{30}$)$_2$(CH$_3$)Si(CH$_2$)$_4$C(H)(X)—CO$_2$R, (CH$_3$O)$_3$Si(CH$_2$)$_9$C(H)(X)—CO$_2$R, (CH$_3$O)$_2$(CH$_3$)Si(CH$_2$)$_9$C(H)(X)—CO$_2$R, (CH$_3$O)$_3$Si(CH$_2$)$_3$C(H)(X)—C$_6$H$_5$, (CH$_3$O)$_2$(CH$_3$)Si(CH$_2$)$_3$C(H)(X)—C$_6$H$_5$, (CH$_3$O)$_3$Si(CH$_2$)$_4$C(H)(X)—C$_6$H$_5$ and (CH$_3$O)$_2$(CH$_3$)Si(CH$_2$)$_4$C(H)(X)—C$_6$H$_5$, (in each of the above formulas, X represents chlorine, bromine or iodine; R represents a C$_{1-20}$ alkyl, aryl or aralkyl group)

The hydroxyl group-containing organohalogen compound or halogenated sulfonyl compound mentioned above is not particularly restricted but includes compounds of the following formula.

$$HO-(CH_2)_n-OC(O)C(H)(R)(X)$$

(wherein X represents chlorine, bromine or iodine; R represents a hydrogen atom or a $C_{1-20}$ alkyl, aryl or aralkyl group; n represents an integer of 1 to 20)

The amino group-containing organohalogen compound or halogenated sulfonyl compound mentioned above is not particularly restricted but includes the following compound, for instance.

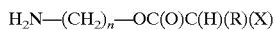

$H_2N-(CH_2)_n-OC(O)C(H)(R)(X)$ (wherein X represents chlorine, bromine or iodine; R represents a hydrogen atom or a $C_{1-20}$ alkyl, aryl or aralkyl group; n represents an integer of 1 to 20)

The epoxy group-containing organohalogen compound or halogenated sulfonyl compound mentioned above is not particularly restricted but includes the following compound.

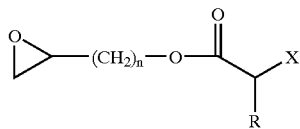

(wherein X represents chlorine, bromine or iodine; R represents a hydrogen atom or a $C_{1-20}$ alkyl, aryl or aralkyl group; n represents an integer of 1 to 20)

For the production of a polymer having two or more reactive functional groups per molecule, it is good practice to use an organohalogen or halogenated sulfonyl compound having two or more initiation sites as an initiator. As examples, the following compounds can be mentioned.

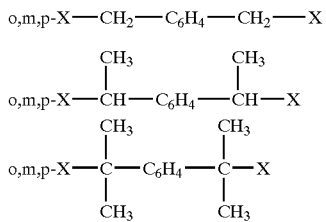

(In the formulae, $C_6H_4$ represents phenylene group, X represents chlorine, bromine or iodine)

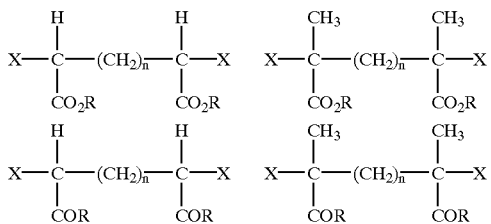

(In the formulae, R represents an alkyl group of 1 to 20 carbon atoms, an aryl group of 6 to 20 carbon atoms or an aralkyl group of 7 to 20 carbon atoms, n represents an integer of 0 to 20, X represents chlorine, bromine or iodine)

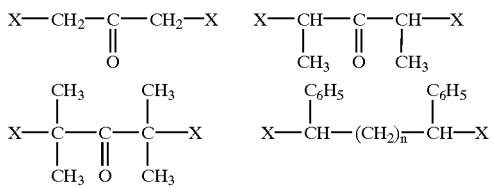

(In the formulae, X represents chlorine, bromine or iodine, n represents an integer of 0 to 20)

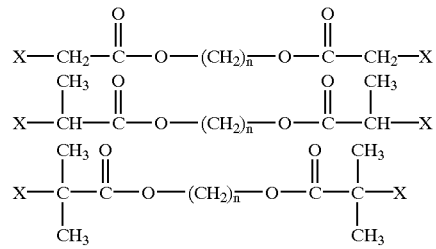

(In the formulae, n represents an integer of 0 to 20, and X represents chlorine, bromine or iodine)

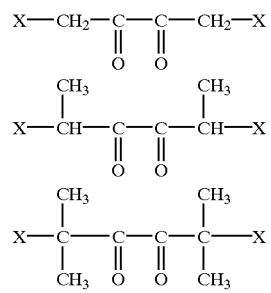

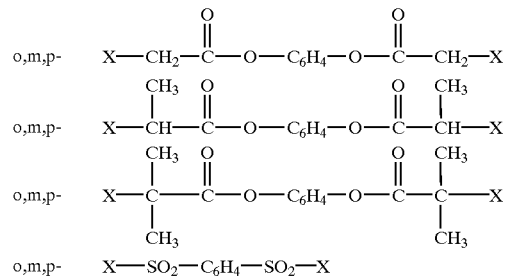

(In the formulae, X represents chlorine, bromine or iodine)

The transition metal complex for use as the polymerization catalyst is not particularly restricted but preferably is a metal complex the center metal of which is an metal belonging to group 7, 8, 9, 10 or 11 of the periodic table of the elements. As still more preferred catalysts, there can be mentioned complexes of o-valent copper, univalent copper, bivalent ruthenium, bivalent iron or bivalent nickel. Particularly preferred are copper complexes. As compounds of univalent copper, there can be mentioned cuprous chloride, cuprous bromide, cuprous iodide, cuprous cyanide, cuprous oxide, and cuprous perchlorate, among others. When a copper compound is used, such a ligandas 2,2'-bipyridyl or a derivative thereof, 1,10-phenanthroline or a derivative thereof, or a polyamine such as tetramethylethylenediamine, pentamethyldiethylenetriamine or hexamethyltris(2-aminoethyl)amine is added for enhanced catalyst activity. The bivalent ruthenium chloride tristriphenylphosphine complex ($RuCl_2(PPh_3)_3$) is also a preferred catalyst. When a ruthenium compound is used as the catalyst, an aluminum alkoxide is added as an activator. Aside from the above, bivalent iron bistriphenylphosphine complex ($FeCl_2(PPh_3)_2$), bivalent nickel bistriphenylphosphine complex ($NiCl_2(PPh_3)_2$), and bivalent nickel bistributylphosphine complex ($NiBr_2(PBu_3)_2$) are also preferred catalysts.

The vinyl monomer which can be used for this polymerization is not particularly restrictedbut includes, for example, (meth)acrylic monomers such as (meth)acrylic acid, methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-pentyl (meth)acrylate, n-hexyl (meth)acrylate, cycnohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth) acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2perfluorobutylethyl (meth)acrylate, 2-perfluoroethyl (meth)acrylate, perfluoromethyl (meth)acrylate, diperfluoromethylmethyl (meth)acrylate, 2-perfluoromethyl 2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, etc.; styrenic monomers such as styrene, vinyltoluene, α-methylstyrene, chlorostyrene, styrenesulfonic acid and its salt, etc.; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, monoalkyl and dialkyl esters of maleic acid; fumaric acid, monoalkyl and dialkyl esters of fumaric acid, etc.; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride, allyl alcohol and so forth. These may be used each alone or a plurality of them may be copolymerized. In consideration of the physical characteristics of the product, styrenic monomers and (meth) acrylic monomers are particularly preferred. More preferred are acrylate monomers and methacrylate monomers; particularly more preferred are acrylate monomers; and still more preferred is butyl acrylate. In the present invention, any of these preferred monomers may be copolymerized with other monomers and even block-copolymerized, and in such cases the preferred monomer preferably accounts for at least 40% by weight of the copolymer. In the mode of expression used in this specification, (meth)acrylic acid means acrylic acid and/or methacrylic acid.

The polymerization reaction can be carried out in the absence of a solvent but may be carried out in various solvents. The kind of solvent which can be used is not particularly restricted but includes hydrocarbon solvents such as benzene, toluene, etc.; ether solvents such as diethyl ether, tetrahydrofuran, diphenyl ether, anisole, dimethoxybenzene, etc.; halogenated hydrocarbon solvents such as methylene chloride, chloroform, chlorobenzene, etc.; ketone solvents such as acetone, methyl ethyl ketone, methyl isobutyl ketone, etc.; alcohol solvents such as methanol, ethanol, propanol, isopropyl alcohol, n-butyl alcohol, tert-butyl alcohol, etc.; nitrile solvents such as acetonitrile, propionitrile, benzonitrile, etc.; ester solvents such as ethyl acetate, butyl acetate, etc.; carbonate solvents such as ethylene carbonate, propylene carbonate, etc.; and amide solvents such as N,N-dimethylformamide, N,N-dimethylacetamide, etc.; among others. These may be used each alone or two or more of them may be used in combination. The polymerization may also be carried out in an emulsion system or a system using supercritical fluid $CO_2$ as the medium.

Though not limited, the polymerization reaction can be conducted in the temperature range of 0 to 200° C., preferably at a temperature from room temperature to 150° C.

Vinyl Polymer

The vinyl polymer of the present invention is now described in detail.

The vinyl polymer is not particularly restricted but preferably is produced by the atom transfer radical polymerization of a vinyl monomer. The vinyl monomer mentioned above is not particularly restricted but those monomers mentioned hereinbefore by way of example can be employed. These vinyl monomers may be used each alone or a plurality of them may be copolymerized. In consideration of the physical characteristics of the product, styrenic monomers and (meth)acrylic monomers are particularly preferred. More preferred are acrylate monomers and methacrylate monomers; particularly more preferred are acrylate monomers; and still more preferred is butyl acrylate. In the present invention, any of these preferred monomers may be copolymerized with other monomers and even block-copolymerized, and in such cases such preferred monomers preferably account for at least 40% by weight of the copolymer.

The molecular weight distribution, that is to say the ratio of number average molecular weight to weight average molecular weight as determined by gel permeation chromatography, of the vinyl polymer is not particularly restricted but is preferably less than 1.8, more preferably not more than 1.7, still more preferably not more than 1.6, further preferably not more than 1.5, still further preferably not more than 1.4, and most preferably not more than 1.3. In the GPC determination according to the invention, measurements are made using polystyrene gel columns with chloroform as the mobile phase and the number average molecular weights can be calculated from polystyrene equivalents.

The number average molecular weight of the vinyl polymer is not particularly restricted but is preferably within the range of 500 to 1,000,000, more preferably 1000 to 100,000. If the molecular weight is too low, the inherent characteristics of vinyl polymers will not be fully expressed. If, conversely, it is too high, the polymer will be hard to work with.

The vinyl polymer may have a reactive functional group within its molecule. In that case, the reactive functional group may exist at whichever of the side chain or the main chain terminus. The reactive functional group is not particularly restricted but includes alkenyl, hydroxyl, amino, crosslinkable silyl, and polymerizable carbon-carbon double bond, among others. The reactive functional group may be converted to a different functional group of choice in one step or more steps. For example, in the present invention, too, a reactive functional group such as hydroxyl can be transformed so as to give an alkenyl-containing vinyl polymer.

Alkenyl-containing Vinyl Polymer

The alkenyl group-containing vinyl polymer is now described in detail. The alkenyl group-containing vinyl polymer can be used as a component for a hydrosilylatable composition. For example, by subjecting a vinyl polymer having at least one alkenyl group per molecule to hydrosilylation using a hydrosilyl group-containing compound as a curing agent, crosslinking takes place to give a cured product. Furthermore, by subjecting a vinyl polymer having at least one alkenyl group per molecule to hydrosilylation using a hydrosilane compound having a crosslinkable functional group, a vinyl polymer having the crosslinkable functional group can be obtained.

The alkenyl group-containing vinyl polymer can be produced by the atom transfer radical polymerization technique.

The alkenyl group in the context of the invention is not particularly restricted but is preferably represented by the following general formula (6).

$$H_2C=C(R^{13})- \quad (6)$$

(wherein $R^{13}$ represents hydrogen or an organic group containing 1 to 20 carbon atoms)

Referring to the above general formula (6), $R^{13}$ represents hydrogen or an organic group containing 1 to 20 carbon atoms. The organic group containing 1 to 20 carbon atoms is not particularly restricted but is preferably an alkyl group of 1 to 20 carbon atoms, an aryl group of 6 to 20 carbon atoms or an aralkyl group of 7 to 20 carbon atoms. Specifically, the following groups may be mentioned:
—$(CH_2)_n$—$CH_3$, —$CH(CH_3)$—$(CH_2)_n$—$CH_3$, —$CH(CH_2CH_3)$—$(CH_2)_n$—$CH_3$, —$CH(CH_2CH_3)_2$, —$C(CH_3)_2$—$(CH_2)_n$—$CH_3$, —$C(CH_3)(CH_2CH_3)$—$(CH_2)_n$—$CH_3$, —$C_6H_5$, —$C_6H_5(CH_3)$, —$C_6H_5(CH_3)_2$, —$(CH_2)_n$—$C_6H_5$—$(CH_2)_n$—$C_6H_5(CH_3)$ and —$(CH_2)_n$—$CH_5(CH_3)_2$ (n is an integer equal to 0 or more; the total number of carbon atoms in each group is not larger than 20)

Among these, hydrogen or a methyl group is particularly preferred for $R^{13}$.

Furthermore, although it is not restricted, it is preferred that the alkenyl group of the vinyl polymer is not activated by a carbonyl group, alkenyl group or aromatic ring that may be conjugated with the carbon-carbon double bond.

The mode of binding of the alkenyl group to the main chain of the polymer is not particularly restricted but is preferably through a carbon-carbon linkage, an ester linkage, an ether linkage, a carbonate linkage, an amide linkage, a urethane linkage or the like.

It is only sufficient that the alkenyl group exists within the molecule of the vinyl polymer but when the cured product available from the curable composition of the invention is particularly required to have rubber-like properties, it is preferred that at least one of the alkenyl groups exists at the molecular chain terminus. This is because the inter-crosslink molecular weight, which considerably effects rubber elasticity, can then be sufficiently large. More preferably, all alkenyl groups exist at the molecular chain termini.

The number of alkenyl groups is not particularly restricted but in order that a cured product of high crosslink density may be obtained, the average number is preferably not less than 1, more preferably not less than 1.2, still more preferably not less than 1.5.

The technology of producing an alkenyl group-containing vinyl polymer is now described in detail. It should, however, be understood that the following processes are merely illustrative and not exclusive choices.

(A-a) A process which, in synthesizing a vinyl polymer by atom transfer radical polymerization, comprises reacting a compound having both a polymerizable alkenyl group and a sparingly polymerizable alkenyl group per molecule, such as a compound represented by the following general formula (9), as a second monomer.

$$H_2C=C(R^{14})-R^{15}-R^{16}-C(R^{17})=CH_2 \quad (9)$$

(wherein $R^{14}$ represents hydrogen or methyl; $R^{15}$ represents—$C(O)O$— or an o-, m-, or p-phenylene group; $R^{16}$ represents a direct bond or a bivalent organic group of 1 to 20 carbon atoms which may optionally contain 1 or more ether bonds; $R^{17}$ represents hydrogen or an organic group of 1 to 20 carbon atoms)

Referring to the above general formula (9), $R^{17}$ is hydrogen or an organic group containing 1 to 20 carbon atoms. The organic group containing 1 to 20 carbon atoms is not particularly restricted but is preferably an alkyl group of 1 to 20 carbon atoms, an aryl group of 6 to 20 carbon atoms or an aralkyl group of 7 to 20 carbon atoms. Specifically, the following groups, among others, may be mentioned:

—$(CH_2)_n$—$CH_3$, —$CH(CH_3)$—$(CH_2)_n$—$CH_3$, —$CH(CH_2CH_3)$—$(CH_2)_n$—$CH_3$, —$CH(CH_2CH_3)_2$, —$C(CH_3)_2$—$(CH_2)_n$—$CH_3$, —$C(CH_3)(CH_2CH_3)$—$(CH_2)_n$—$CH_3$, —$C_6H_5$, —$C_6H_5(CH_3)$, —$C_6H_5(CH_3)_2$, —$(CH_2)_n$—$C_6H_5$—$(CH_2)_n$—$C_6H_5(CH_3)$, —$(CH_2)_n$—$C_6H5(CH_3)_2$ (n represents an integer of 0 or more; the total number of carbon atoms in each group is not more than 20)

Among these groups, hydrogen and methyl are preferred for $R^{17}$.

The timing of reacting said compound having both a polymerizable alkenyl group and a sparingly polymerizable alkenyl group per molecule is not particularly restricted but when the cured product available from the vinyl polymer is required to have rubber-like properties, this second monomer is preferably caused to react in a terminal stage of polymerization reaction or after completion of the reaction of the primary monomer.

(A-b) A process which, in synthesizing a vinyl polymer by atom transfer radical polymerization, comprises reacting a compound having at least two sparingly polymerizable alkenyl groups, such as 1,5-hexadiene, 1,7-octadiene or 1,9-decadiene, in a terminal stage of polymerization reaction or after completion of the reaction of the primary monomer.

(A-c) A process in which a vinyl polymer having at least one highly reactive carbon-halogen bond at the molecular chain terminus as obtainable by atom transfer radical polymerization is reacted with an alkenyl group-containing organometal compound such as allyltributyltin, allyltrioctyltin or the like to substitute for the halogen.

(A-d) A process in which a vinyl polymer having at least one highly reactive carbon-halogen bond at the molecular chain terminus as obtainable by atom transfer radical polymerization is reacted with a stabilized carbanion having an alkenyl group, such as the one represented by the following general formula (10) to substitute for the halogen.

$$M^+C^-(R^{18})(R^{19})-R^{20}-C(R^{17})=CH_2 \quad (10)$$

(wherein $R^{17}$ is as defined above; $R^{18}$ and $R^{19}$ each represents an electron-attracting group stabilizing the carbanion $C^-$ or one of $R^{18}$ and $R^{19}$ represents such an electron-attracting group with the other representing a hydrogen atom, a $C_{1-10}$ alkyl group or a phenyl group; $R^{20}$ represents a direct bond or a bivalent organic group containing 1 to 10 carbon atoms, which may optionally contain one or more ether bonds; $M^+$ represents an alkali metal ion or a quaternary ammonium ion)

The electron-attracting group for $R^{18}$ and $R^{19}$ includes —$CO_2R$ (ester group), —$C(O)R$ (keto group), —$CON(R_2)$ (amide group), —$COSR$ (thioestergroup), —$CN$ (nitrile group), —$NO_2$ (nitro group) and so forth, although —$CO_2R$, —$C(O)R$ and —$CN$ are particularly preferred. The substituent R is an alkyl group of 1 to 20 carbon atoms, an aryl group of 6 to 20 carbon atoms or an aralkyl group of 7 to 20 carbon atoms, preferably an alkyl group of 1 to 10 carbon atoms or a phenyl group.

(A-e) A process in which a vinyl polymer having at least one highly reactive carbon-halogen bond at the terminus thereof as obtainable by atom transfer radical polymerization is treated with an elemental metal, e.g. zinc, or an organometal compound to give an enolate anion which is then reacted with an alkenyl group-containing electrophilic compound, for example an alkenyl group-containing compound having a leaving group such as halogen or acetyl, an alkenyl group-containing carbonyl compound, an alkenyl group-containing isocyanate compound, an alkenyl group-containing acid halide or the like.

(A-f) A process in which a vinyl polymer having at least one highly reactive carbon-halogen bond at the terminus thereof as obtainable by atom transfer radical polymerization is reacted with an alkenyl group-containing oxoanion or carboxylate anion such as the one represented by the following general formula (11) or (12) to substitute for the halogen.

$$H_2C=C(R^{17})-R^{21}-O^-M^+ \quad (11)$$

(wherein $R^{17}$ and $M^+$ are as defined above; $R^{21}$ represents a bivalent organic group of 1~20 carbon atoms which may optionally contain 1 or more ether bonds)

$$H_2C=C(R^{17})-R^{22}-C(O)O^-M^+ \quad (12)$$

(wherein $R^{17}$ and $M^+$ are as defined above; $R^{22}$ represents a direct bond or a bivalent organic group of 1~20 carbon atoms which may optionally contain 1 or more ether bonds)

Among the processes (A-a) through (A-f), the processes (A-b) and (A-f) are preferred from the standpoint of ease of control. The introduction processes (A-b) and (A-f) are now described in detail.

Diene Compound Addition [Process (A-b)]

The process (A-b) is characterized in that a vinyl polymer obtainable by the atom transfer radical polymerization of a vinyl monomer is reacted with a compound having at least two sparingly polymerizable alkenyl groups (hereinafter referred to as "diene compound").

In the diene compound, said at least two alkenyl groups may be the same or different. The alkenyl group may be a terminal alkenyl group [CH$_2$=C(R)—R'; R is hydrogen or a C$_{1-20}$ organic group; R' is a C$_{1-20}$ organic group; R and R' may be bonded together to form a cyclic structure] or an internal alkenyl group [R'—C(R)=C(R)—R'; R is hydrogen or a C$_{1-20}$ organic group, R' is a C$_{1-20}$ organic group, the two R (or two R') groups may be the same or different; any two of the two R groups and two R' groups may be bonded together to form a cyclic structure], although the terminal alkenyl group is preferred. R is hydrogen or an organic group of 1 to 20 carbon atoms, and the latter is preferably a C$_{1-20}$ alkyl group, a C$_{6-20}$ aryl group or a C$_{7-20}$ aralkyl group. Among these, hydrogen or methyl is particularly preferred for R.

Of the alkenyl groups of said diene compound, at least two alkenyl groups may have been conjugated.

A specific example of the diene compound includes, for example, isoprene, piperylene, butadiene, myrcene, 1,5-hexadiene, 1,7-octadiene, 1,9-decadiene and 4-vinyl-1-cyclohexane, although 1,5-hexadiene, 1,7-octadiene and 1,9-decadiene are preferred.

The objective alkenyl-terminated vinyl polymer may be obtained by subjecting a vinyl monomer to living radical polymerization, isolating the polymer from the polymerization system, and subjecting the isolated polymer and a diene compound to radical reaction. However, the procedure of adding the diene compound to the polymerization reaction system in a terminal stage of polymerization or after completion of the reaction of the predetermined (primary) vinyl monomer is more expedient and, hence, preferred.

The addition amount of the diene compound is preferably adjusted according to the radical reactivity of the alkenyl groups of the diene compound. When there is a large difference in reactivity between the two alkenyl groups, the amount of the diene compound relative to the polymer growing terminus may be only equimolar or a small excess but when there is no difference or only a small difference in reactivity between two alkenyl groups, both alkenyl groups react to cause coupling of the polymer termini so that the amount of the diene compound relative to the polymer growing terminus is preferably an excess, more preferably not less than 1.5 equivalents, still more preferably not less than 3 equivalents, particularly not less than 5 equivalents.

Nucleophilic Substitution [Process (A-f)]

The process (A-f) is characterized in that a vinyl polymer having at least one highly reactive terminal carbon-halogen bond as obtainable by atom transfer radical polymerization is reacted with an alkenyl group-containing oxoanion or carboxylate anion for substitution for the halogen.

The alkenyl group-containing oxoanion or carboxylate anion is not particularly restricted but includes, among others, the anions represented by the following general formulas (11) and (12), respectively.

$$H_2C=C(R^{17})-R^{21}-O^-M^+ \quad (11)$$

(wherein $R^{17}$ and $M^+$ are as defined above; $R^{21}$ represents a bivalent organic group of 1 to 20 carbon atoms which may optionally contain 1 or more ether bonds)

$$H_2C=C(R^{17})-R^{22}-C(O)O^-M^+ \quad (12)$$

(wherein $R^{17}$ and $M^+$ are as defined above; $R^{22}$ represents a direct bond or a bivalent organic group of 1 to 20 carbon atoms which may optionally contain 1 or more ether bonds)

As specific examples of the oxoanion or carboxylate anion, there can be mentioned: the basic compound including ammonia; alkylamines such as trimethylamine, triethylamine, tributylamine, etc.; polyamines such as tetramethylethylenediamine, pentamethyldiethylenetriamine, etc.; and pyridine compounds such as pyridine, picoline, etc., among others.

The amount of use of the basic compound relative to the precursor compound is equimolar to a small excess, preferably 1 to 1.2 equivalents.

The solvent for use in reacting said precursor compound with said basic compound includes, for example, salts of alkenyl alcohols such as allyl alcohol; salts of allyloxy alcohols such as ethylene glycol monoallyl ether; salts of alkenyl-containing phenolic hydroxy compounds such as allylphenol, allyloxyphenol, etc.; salts of alkenyl-containing carboxylic acids such as 10-undecylenic acid, 4-pentenoic acid, vinylacetic acid, etc.; among others.

$M^+$ represents a counter cation and includes, for example, alkali metal ions such as lithium ion, sodium ion and potassium ion and quaternary ammonium ions. The quaternary ammonium ions include tetramethylammonium ion, tetraethylammonium ion, tetrabenzylammonium ion, trimethyldodecylammonium ion, tetrabutylammonium ion and dimethylpyperidinium ion. The preferred is sodium ion or potassium ion.

The amount of use of the oxoanion or carboxylate anion need only be an excess over the halogen and preferably 1 to 5 equivalents, more preferably 1 to 2 equivalents, still more preferably 1.0 to 1.2 equivalents.

The solvent which can be used for this reaction is not particularly restricted but is preferably a solvent of comparatively high polarity. Thus, for example, there can be mentioned ether solvents such as diethyl ether, tetrahydrofuran, diphenyl ether, anisole, dimethoxybenzene, etc.; halogenated hydrocarbon solvents such as methylene chloride, chloroform, etc.; ketone solvents such as acetone, methyl ethyl ketone, methyl isobutyl ketone, etc.; alcohol solvents such as methanol, ethanol, propanol, isopropyl alcohol, n-butyl alcohol, tert-butyl alcohol, etc.; nitrile solvents such as acetonitrile, propionitrile, benzonitrile, etc.; ester solvents such as ethyl acetate, butyl acetate, etc.; carbonate solvents such as ethylene carbonate, propylene carbonate, etc.; amide solvents such as N,N-dimethylformamide, N,N-dimethylacetamide, etc.; and sulfoxide solvents such as dimethyl sulfoxide and the like. These can be used each alone or two or more of them may be used in admixture. Among the above solvents, polar solvents such as acetone, dimethyl sulfoxide, N,N-dimethylformamide, N,N-dimethylacetamide, hexamethylphosphoric triamide, acetonitrile, etc. are preferred. The reaction temperature is not restricted but is generally 0 to 150° C., preferably room temperature to 100° C.

As a reaction promoter, an amine, an ammonium salt, a crown ether or the like may be added to the reaction system.

Instead of using the oxoanion or carboxylate anion, the precursor alcohol or carboxylic acid may be caused to react with abase in the reaction system to give the oxoanion or carboxylate anion.

When an ester group exists whether in a side chain or in the main chain of the vinyl polymer, an oxoanion which is highly nucleophilic may induce an ester interchange. Therefore, it is preferred to employ a carboxylate anion which is low in nucleophilic.

Conversion of Hydroxyl to Alkenyl

A vinyl polymer having at least one alkenyl group can also be obtained from a vinyl polymer having at least one hydroxyl group and, for this purpose, any of the following alternative processes can be employed, although these are not exclusive choices.

(A-g) A process which comprises permitting a base such as sodium methoxide to act on the hydroxyl group of a vinyl polymer having at least one hydroxyl group, and further reacting the polymer with an alkenyl group-containing halide such as allyl chloride.

(A-h) A process which comprises permitting an alkenyl group-containing isocyanate compound such as allyl isocyanate to react with the hydroxyl group of a vinyl polymer having at least one hydroxyl group.

(A-i) A process which comprises causing an alkenyl group-containing acid halide such as (meth)acryloyl chloride or 10-undecenoyl chloride to react with the hydroxyl group of a vinyl polymer having at least one hydroxyl group in the presence of a base such as pyridine.

(A-j) A process which comprises causing an alkenyl group-containing carboxylic acid, such as acrylic acid, pentenoic acid and 10-undecenoic acid, to react with the hydroxyl group of a vinyl polymer having at least one hydroxyl group in the presence of an acid catalyst.

(A-k) A process which comprises reacting a vinyl polymer having a hydroxyl group with a diisocyanate compound and then causing a compound having both an alkenyl group and a hydroxyl group to react with the residual isocyanato group. The compound having both an alkenyl group and a hydroxyl group is not particularly restricted but includes alkenyl alcohols such as 10-undecenol, 5-hexenol and allyl alcohol, among others.

The isocyanate compound is not particularly restricted but includes all the known diisocyanates. Thus, for example, toluylene diisocyanate, 4,4'-diphenylmethane diisocyanate, hexamethyl diisocyanate, xylylene diisocyanate, metaxylylene diisocyanate, 1,5-naphthalene diisocyanate, hydrogenated diphenylmethane diisocyanate, hydrogenated toluylene diisocyanate, hydrogenated xylylene diisocyanate, isophorone diisocyanate, and so forth. These can be used each alone or two or more of them may be used in combination. Blocked isocyanates may also be employed.

For expression of higher whether resistance, it is preferred to use a diisocyanate having no aromatic ring, such as hexamethylene diisocyanate compound or hydrogenated diphenylmethane diisocyanate.

Synthesis of Hydroxyl Group-containing Vinyl Polymer

The vinyl polymer having at least one hydroxyl group for use in (B) and (A-g) to (A-j) can be produced by any of the following process, and however those processes are not limitative.

(B-a) A process which, in synthesizing a vinyl polymer by atom transfer radical polymerization, comprises reacting a compound having both a polymerizable alkenyl group and a hydroxyl group per molecule thereof, such as the one represented by the following general formula (15), as a second monomer.

$$H_2C=C(R^{14})-R^{15}-R^{16}-OH \qquad (15)$$

(wherein $R^{14}$, $R^{15}$ and $R^{16}$ are as defined hereinbefore)

The timing of reacting the compound having both a polymerizable alkenyl group and a hydroxyl group per molecule thereof is not particularly restricted but when rubber-like properties are sought by living radical polymerization, this compound is preferably reacted as a second monomer in a terminal stage of the polymerization reaction or after completion of the reaction of the primary monomer.

(B-b) A process which, in synthesizing a vinyl polymer by atom transfer radical polymerization, comprises reacting an alkenyl alcohol, such as 10-undecenol, 5-hexenol or allyl alcohol, in a terminal stage of the polymerization reaction or after completion of the reaction of the primary monomer.

(B-f) A process in which a halogen atom of a vinyl polymer having at least one highly reactive carbon-halogen bond at the terminus thereof as obtainable by atom transfer radical polymerization is hydrolyzed or reacted with a hydroxyl group-containing compound to introduce a hydroxyl group into the polymer terminus.

(B-g) A process which comprises reacting a vinylpolymer having at least one highly reactive carbon-halogen bond at the terminus thereof as obtainable by atom transfer radical polymerization with a hydroxyl group-containing stabilized carbanion such as the one represented by the following general formula (16) for substitution for the halogen.

$$M^+C^-(R^{18})(R^{19})-R^{20}-OH \qquad (16)$$

(wherein $R^{18}$, $R^{19}$ and $R^{20}$ are respectively as defined hereinbefore)

The electron-attracting group for $R^{18}$ and $R^{19}$ includes —$CO_2R$ (estergroup), —C(O)R (keto group), —CON($R_2$) (amide group), —COSR (thioester group), —CN (nitrite group) and —$NO_2$ (nitro group), among others, although —$CO_2R$, —C(O)R and —CN are especially preferred. The substituent R is an alkyl group of 1 to 20 carbon atoms, an aryl group of 6 to 20 carbon atoms or an aralkyl group of 7 to 20 carbon atoms, preferably an alkyl group of 1 to 10 carbon atoms or a phenyl group.

(B-h) A process in which a vinyl polymer having at least one highly reactive carbon-halogen bond at the terminus thereof as obtainable by atom transfer radical polymerization is treated with an elemental metal, such as zinc, or an organometal compound to give an enolate anion which is then reacted with an aldehyde or a ketone.

(B-i) A process in which a vinyl polymer having at least one highly reactive carbon-halogen bond at the terminus thereof as obtainable by atom transfer radical polymerization is reacted with a hydroxyl group-containing oxoanion or carboxylate anion such as the one represented by the general formula (17) or (18) for substitution for the halogen.

$$HO-R^{21}-O^-M^+ \qquad (17)$$

(wherein $R^{21}$ and $M^+$ are respectively as defined hereinbefore)

$$HO-R^{22}-C(O)O^-N^+ \qquad (18)$$

(wherein $R^{22}$ and $M^+$ are respectively as defined hereinbefore)

Referring to $M^+$, reaction conditions, solvent and other reaction parameters, those mentioned in the description of (A-f) can all be used with advantage.

(B-j) A process which, in synthesizing a vinyl polymer by atom transfer radical polymerization, comprises reacting a compound having both a sparingly polymerizable alkenyl group and a hydroxyl group per molecule thereof as a second monomer in a terminal stage of the polymerization reaction or after completion of the reaction of the primarymonomer. The compound mentioned just above is not particularly restricted but includes the compound represented by the following general formula (19).

$$H_2C=C(R^{14})-R^{21}-OH \qquad (19)$$

(wherein $R^{14}$ and $R^{21}$ are respectively as defined hereinbefore)

The compound represented by the above general formula (19) is not particularly restricted but from availability points of view, an alkenyl alcohol such as 10-undecenol, 5-hexenol or allyl alcohol is preferred.

Among the synthetic processes (B-a) through (B-j), the processes (B-b) and (B-i) are preferred in view of the ease of control.

Treatment with Oxidizing Agent

The treatment with an oxidizing agent is now described in detail. The purification technology according to the invention is characterized in that an oxidizing agent is brought into contact with a vinyl polymer. The treatment with an oxidizing agent according to the invention is also a method for purification of a vinyl polymer for use as a component of a hydrosilylatable composition. This purification technology can also be applied to vinyl polymers produced by techniques other than atom transfer radical polymerization.

The oxidizing agent for use in this purification method is now described, although these are merely illustrative and by no means exhaustive.

(C-a) Heavy metal-containing compounds: specifically manganese dioxide; permanganates such as sodium permanganate, potassiumpermanganate, etc.; manganese salts such as manganese acetate, manganese sulfate, manganese pyrophosphate, etc.; chromium trioxide; dichromates such as sodium dichromate, potassium dichromate, ammonium dichromate, etc.; chromyl chloride; t-butyl chromate; chromyl acetate; lead tetraacetate; lead oxide; mercury acetate; mercury oxide; osmiumtetraoxide; ruthenium tetraoxide; selenium dioxide; etc. can be mentioned.

(C-b) Halogens and halogen compounds: specifically halogens such as chlorine, bromine, iodine, etc.; and interhalogen compounds such as chlorine fluoride, chlorine trifluoride, bromine trifluoride, bromine pentafluoride, bromine chloride, iodine chloride, etc. can be mentioned.

(C-c) Nitrogen oxide-containing compounds: specifically nitric acid; nitrates such as sodium nitrate, potassium nitrate, ammonium nitrate, etc.; nitrites such as sodium nitrite, potassium nitrite, etc.; and nitrogen oxide such as dinitrogen oxide, dinitrogen trioxide, nitrogen dioxide, etc. can be mentioned.

(C-d) Halogen/oxygen-containing compounds: specifically chlorine dioxide; perhalic acids such as perchloric acid, periodic acid, etc.; chlorates such as sodium chlorate, potassium chlorate, ammonium chlorate, etc.; perchlorates such as sodium perchlorate, potassium perchlorate, ammonium perchlorate, etc.; chlorites such as sodium chlorite, potassium chloride, etc.; hypochlorites such as sodium hypochlorite, calcium hypochlorite, etc.; bromates such as sodium bromate, potassium bromate, etc.; iodates such as sodium iodate, potassiumiodate, etc.; andperiodates such as sodiumperiodate, potassium periodate, etc. can be mentioned.

(C-e) Metal peroxides: specifically alkali metal peroxides such as sodiumperoxide, potassiumperoxide, etc.; and alkaline earth metal peroxides such as magnesium peroxide, calcium peroxide, barium peroxide, etc. can be mentioned.

(C-f) Organic peroxides: specifically alkyl hydroperoxides such as t-butyl hydroperoxide, cumyl hydroperoxide, etc.; diacyl peroxides such as dibenzoyl peroxide, di-p-nitrobenzoyl peroxide, di-p-chlorobenzoyl peroxide, etc.; organic peracids such as peracetic acid, trifluoroperacetic acid, perbenzoic acid, metachloroperbenzoic acid, monoperoxyphthalic acid, performic acid, etc.; peracid esters such as t-butyl peracetate, t-butyl perbenzoate, etc.; and dialkyl peroxides such as di-t-butyl peroxide etc. can be mentioned.

(C-g) Hydrogen peroxide and its derivatives: specifically hydrogen peroxide; sodium percarbonates; perborates such as sodiumperborate, potassiumperborate, etc.; urea peroxide, etc. can be mentioned. These compounds are characterized in that when dissolved in water or decomposed by heating, they release hydrogen peroxide.

(C-h) Oxygen, ozone

Aside from the foregoing, persulfates such as sodium persulfate, potassiumpersulfate, ammoniumpersulfate, etc. potassiumnitrosodisulfonate; trichloroisocyanuric acids; etc. can also be mentioned.

These may be used each alone or in a combination of two or more species. In consideration of the ease of handling and the ease of removal of residues after polymer treatment, oxidizing agents from nitrogen oxide-containing compounds (C-c) through oxygen/ozone (C-h) are preferred, and hydrogen peroxide and its derivatives (C-g) and oxygen/ozone (C-h) are still more preferred.

The vinyl polymer may be contacted with the oxidizing agent in the absence of a solvent or under dilution with a solvent. The solvent for dilution may be any of the common solvents. The temperature of this treatment with an oxidizing agent is not particularly restricted but the treatment is carried out generally at 0° C. to 200° C., preferably at a temperature from room temperature to 100° C. The amount of use of the oxidizing agent may range from 0.01 to 500 parts by weight relative to 100 parts by weight of the vinyl polymer but from economic and workability points of view, the range of 0.05 to 10 parts by weight on the same basis is preferred.

When the oxidizing agent is a solid, the solid-liquid contact between the oxidizing agent and the polymer or polymer solution can be achieved in various modes. Thus, not only a batch system where agitation for mixing and solid-liquid separation are carried out batchwise but also a fixed-bed system in which the polymer solution is passed through a bed packed with the oxidizing agent, a moving-bed system in which the solution is passed through a moving bed of the oxidizing agent, or a fluidized bed system in which the oxidation is effected with the oxidizing agent fluidized with a liquid. Furthermore, where necessary, in addition to the mixing and dispersing under agitation, the shaking of the vessel, ultrasonication, and other procedures for enhancing the dispersion efficiency can be practiced.

After contact of the polymer or polymer solution with the oxidizing agent, the oxidizing agent is removed by filtration, centrifugation, sedimentation or the like procedure, where necessary followed by dilution and aqueous rinse, to give the objective clear polymer solution.

The treatment with the oxidizing agent may be carried out on the end product vinyl polymer or on an intermediate in the course of production of the vinyl polymer. Taking an alkenyl group-containing vinyl polymer obtained by atom transfer radical polymerization as an example, this treatment with an oxidizing agent can also be carried out on the vinyl polymer having a highly reactive carbon-halogen bond, a hydroxyl group-containing vinyl compound or the like, which is a production intermediate of said vinyl polymer.

Furthermore, activated carbon or an adsorbent, which will be described hereinafter, can be used in combination with said oxidizing agent. When the treatment is carried out using activated carbon or an adsorbent in conjunction with the oxidizing agent, the oxidizing agent may be admixed with the activated carbon or adsorbent in advance and the mixture brought into contact with the polymer but they may be contacted in independent steps.

Treatment with Reducing Agent

The treatment with a reducing agent is now described in detail. This purification method according to the invention is characterized in that a reducing agent is brought into contact with the vinyl polymer. This treatment with a reducing agent of the invention is also a method for purification of a vinyl polymer for use as a component of a hydrosilylatable composition. This purification method may be applied to vinyl polymers produced by techniques other than atom transfer radical polymerization as well.

The reducing agent which can be used in this purification method includes but is not limited to the following reducing compounds or substances.

(D-a) Metals: specifically alkali metals such as lithium, sodium, potassium, etc.; alkaline earth metals such as berrylium, magnesium, calcium, barium, etc.; aluminum; zinc; etc. can be mentioned. These metals may be alloys with mercury (amalgams).

(D-b) Metal hydrides: specifically, sodiumhydride; germanium hydride; tungsten hydride; aluminum hydrides such as diisobutylaluminum hydride, lithium aluminum hydride, sodium aluminum hydride, sodium triethoxyaluminum hydride, sodium bis(2-methoxyethoxy)aluminum hydride, etc.; and organotin hydrides such as triphenyltin hydride, tri-n-butyltin hydride, diphenyltin hydride, di-n-butyltin hydride, triethyltin hydride, trimethyltin hydride, etc. can be mentioned.

(D-c) Silicon hydrides: specifically trichlorosilane, trimethylsilane, triethylsilane, diphenylsilane, phenylsilane, polymethylhydroxysilane, etc. can be mentioned.

(D-d) Boron hydrides: specifically borane, diborane, sodium borohydride, sodium trimethoxyborate hydride, sodium sulfide borohydride, sodium cyanide borohydride, lithium cyanide borohydride, lithiumborohydride, lithiumtriethylborohydride, lithium tri-s-butylborohydride, lithium tri-t-butylborohydride, calcium borohydride, potassium borohydride, zinc borohydride, tetra-n-butylammonium borohydride, etc. can be mentioned.

(D-e) Nitrogenhydrides: specificallyhydrazine, diimide, etc. can be mentioned.

(D-f) Phosphorus compounds: specifically phosphine, trimethylphosphine, triethylphosphine, triphenylphosphine, trimethyl phosphite, triethyl phosphite, triphenyl phosphite, hexamethylphosphorous triamide, hexaethylphosphorous triamide, etc. can be mentioned.

(D-g) Hydrogen (D-h) Aldehydes: specifically formaldehyde, acetaldehyde, benzaldehyde, formic acid, etc. can be mentioned.

(D-i) Sulfur (D-j) Rongalit: Rongalit is a sulfoxylate formaldehyde derivatives of the formula $MSO_2.CH_2O$ and specifically includes sodium formaldehyde sulfoxylate, zinc formaldehyde sulfoxylate, etc.

(D-k) Hydrosulfite: hydrosulfite is a generic term denoting sodium hyposulfite and sodium hyposulfite formaldehyde derivative.

(D-l) Thiourea dioxide.

These may be used each alone or two or more of them may be used in combination. From the standpoint of ease of handling and ease of removal of the reducing agent after polymer treatment, the reducing agents from Rongalit (D-j) through thiourea dioxide (D-l) are preferred.

The vinyl polymer may be contacted with the reducing agent in the absence of a solvent or under dilution with a solvent. The solvent for dilution may be any of the common solvents. The temperature of this treatment with an reducing agent is not particularly restricted but the treatment is carried out generally at 0° C. to 200° C., preferably at a temperature from room temperature to 100° C. The amount of use of the reducing agent may range from 0.01 to 500 parts by weight relative to 100 parts by weight of the vinyl polymer but from economic and workability points of view, the range of 0.05 to 10 parts by weight on the same basis is preferred.

When the reducing agent is a solid, the solid-liquid contact between the reducing agent and the polymer or polymer solution can be achieved in various modes. Thus, not only a batch system where agitation for mixing and solid-liquid separation are carried out batchwise but also a fixed-bed system in which the polymer solution is passed through a bed packed with the reducing agent, a moving-bed system in which the solution is passed through a moving bed of the reducing agent, or a fluidized-bed system in which the reduction is effected with the reducing agent fluidized with a liquid. Furthermore, where necessary, in addition to the mixing and dispersing under agitation, the shaking of the vessel, ultrasonication, and other procedures for enhancing the dispersion efficiency can be practiced.

After contact of the polymer or polymer solution with the reducing agent, the reducing agent is removed by filtration, centrifugation, sedimentation or the like procedure, where necessary followed by dilution and aqueous rinse, to give the objective clear polymer solution.

The treatment with the reducing agent may be carried out on the end product vinyl polymer or on an intermediate in the course of production of the vinyl polymer. Taking an alkenyl group-containing vinyl polymer obtained by atom transfer radical polymerization as an example, this treatment with an reducing agent can also be carried out on the vinyl polymer having a highly reactive carbon-halogen bond, a hydroxyl group-containing vinyl compound or the like, which is a production intermediate of said vinyl polymer.

Furthermore, activated carbon or an adsorbent, which will be described hereinafter, can be used in combination with said reducing agent. When the treatment is carried out using activated carbon or an adsorbent in conjunction with the reducing agent, the reducing agent may be admixed with the activated carbon or adsorbent in advance and the mixture brought into contact with the polymer but the two materials may be contacted in independent steps.

Adsorrption Treatment

The adsorption treatment is now described in detail.

Activated carbon is a charcoal which is mostly carbonaceous and highly absorbent. The production technology comprises treating wood, brown coal, peat or the like with an activator such as zinc chloride or phosphoric acid and subjecting it to dry distillation or activating wood or the like with steam. Activated carbon is usually powdery or granular and whichever can be used. Chemically activated carbon intrinsically shows acidity reflecting the production process used, while steam-activated carbon shows basicity.

As the adsorbent, a synthetic resin adsorbent such as an ion exchange resin or an inorganic adsorbent such as zeolite can be used in conjunction with activated carbon and the use of carbon in combination with an inorganic adsorbent is particularly preferred.

An ion exchange resin can be used as a synthetic resin type adsorbent. As the ion exchange resin, any of the common acidic or basic ion exchange resins may be utilized. Chelate type ion exchange resins may also be used.

The inorganic adsorbent has the character of a solid acid, a solid base or a solid neutral substance and its grain has a porous structure assuring an exceedingly high adsorbent capacity. As an additional characteristic, the inorganic adsorbent can be used over a broad temperature range from low temperature to high temperature. The inorganic adsorbent is not particularly restricted but typically includes materials predominantly composed of aluminum, magnesium or silicon, or mixtures thereof. For example, silicon dioxide, magnesium oxide; silica gel, silica-alumina, aluminum silicate; activated alumina; clay type adsorbents such as acid clay, activated clay, etc.; zeolite adsorbents as a family of hydrous aluminosilicate minerals such as sodium aluminum silicate; dawsonite compounds; hydrotalcite compounds; and so forth can be mentioned by way of example.

Zeolite is available in native and synthetic types and both may be used.

Silicon dioxide is known to occur in crystalline, amorphous, non-crystalline, and glass-like grades as well as synthetic and native grades. Here, any of them can be used only if it is powdery. Silicon dioxide includes but is not limited to the silicic acid obtainable from a clay mineral prepared by acid treatment of activated clay and synthetic silicas such as Carplex BS304, Carplex BS304F, Carplex #67 and Carplex #80 (all available from Shionogi & Co., Ltd.).

Aluminum silicate is a silicic acid in which part of the silicon has been substituted by aluminum and includes such known substances as pumice, fly ash, kaolin, bentonite, activated clay, diatomaceous earth and so forth. Among them, synthetic aluminum silicates have large specific surface areas and are highly adsorbent. As synthetic aluminum silicates, Kyowaad 700 Series (Kyowa Chemical) can be mentioned but these are not exclusive choices.

Hydrotalcite compounds are a hydroxide or carbonate hydrate of aluminum or magnesium. As synthetic grades, Kyowaad 500 Series and Kyowaad 1000 Series (all the product of Kyowa Chemical), among others, can be mentioned.

It is also preferred to use an acidic adsorbent and/or a basic adsorbent in combination with activated carbon. The term "acidic (or basic) adsorbent" as used in this specification means "an adsorbent that shows acidity (or basicity when it is a basic adsorbent) in solution" or "an adsorbent having a large adsorption capacity for basic compounds (acidic compounds in the case of a basic adsorbent)". The adsorbent to be used concomitantly is preferably an inorganic adsorbent and the species mentioned above can be employed. Thus, as acidic inorganic adsorbents, there can be mentioned acid clay, activated clay, aluminum silicate, and so forth. As basic inorganic adsorbents, activated alumina, zeolite adsorbents constituting a family of hydrous aluminosilicate minerals such as sodium aluminum silicate, and hydrotalcite compounds can be mentioned.

Activated carbon and other adsorbents may be used each alone or as an admixture.

The vinyl polymer produced by atom transfer radical polymerization can be purified by contacting it with activated carbon. When the adsorption treatment is to be carried out with a combination of activated carbon and other adsorbent, a mixture of these adsorbents may be brought into the polymer but optionally these adsorbents may be independently contacted with the polymer. Such contacting may be carried out in the absence of a solvent or under dilution with a solvent. The solvent for dilution may be any of the common solvents. The temperature of this treatment with an adsorbent is not particularly restricted but the treatment is carried out generally at 0° C. to 200° C., preferably at a temperature from room temperature to 180° C. The amount of use of the adsorbent may range from 0.1 to 500 parts by weight relative to 100 parts by weight of the vinyl polymer but from economic and workability points of view, the range of 0.5 to 10 parts by weight on the same basis is preferred.

The solid-liquid contact between the adsorbent and the polymer or polymer solution can be effected in various modes. Thus, not only a batch system where agitation for mixing and solid-liquid separation are carried out batchwise but also a fixed-bed system in which the polymer solution is passed through a bed of the adsorbent, a moving-bed system in which the solution is passed through a bed of the adsorbent, or a fluidized-bed system in which the adsorption is effected with the adsorbent fluidized with a liquid. Furthermore, where necessary, in addition to the mixing and dispersing under agitation, the shaking of the vessel, ultrasonication, and other procedures for enhancing the dispersion efficiency can be practiced.

After contact of the polymer or polymer solution with the adsorbent, the adsorbent is removed by filtration, centrifugation, sedimentation or the like procedure, where necessary followed by dilution and aqueous washing, to give the objective clear polymer solution.

The adsorption treatment may be carried out on the end product vinyl polymer or on an intermediate in the course of production of said vinyl polymer. Taking an alkenyl group-containing vinyl polymer obtained by atom transfer radical polymerization as an example, this adsorption treatment can also be carried out on the vinyl polymer having a highly reactive carbon-halogen bond, a hydroxyl group-containing vinyl compound or the like, which is a production intermediate of said vinyl polymer.

Hydrosilylatable Composition

The hydrosilylatable composition of the invention comprises the vinyl polymer which has been subjected to the above-described adsorption treatment.

The hydrosilylatable composition of this invention may for example comprise (A) an alkenyl group-containing vinyl polymer and (B) a hydrosilyl group-containing compound.

The vinyl polymer mentioned as component (A) is an alkenyl group-containing vinyl polymer obtained by the atom transfer radical polymerization technique described above and the specific polymers already mentioned can be employed. The hydrosilyl group-containing compound as component (B) is not particularly restricted but various species can be employed. For example, compounds having at least 1.1 hydroxysilyl groups per molecule and hydrosilane compounds additionally having a crosslinkable silyl group can be mentioned. Some specific hydrosilylatable compositions are described below.

<Hydrosilylatable Composition (1)>

When the component (B) is a compound having at least 1.1 hydrosilyl groups per molecule, the composition gives a cured product on hydrosilylation. Thus, this hydrosilylatable composition is a curable composition (curable composition (I)).

The compound having at least 1.1. hydrosilyl groups per molecule is not particularly restricted but includes such compounds as the linear polysiloxane represented by the general formula (22) or (23):

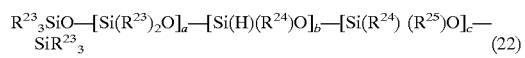  (22)

  (23)

(in the above formulas, $R^{23}$ and $R^{24}$ each represents an alkyl group of 1~6 carbon atoms or a phenyl group; $R^{25}$ represents a $C_{1-10}$ alkyl or aralkyl group; a is an integer satisfying the relation $0 \leq a \leq 100$; b is an integer satisfying the relation $2 \leq b \leq 100$, c is an integer satisfying the relation $0 \leq c \leq 100$); cyclic siloxanes of the following general formula (24)

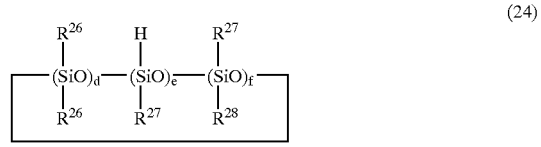  (24)

(wherein $R^{26}$ and $R^{27}$ each represents a $C_{1-6}$ alkyl group or a phenyl group; $R^{28}$ represents a $C_{1-10}$ alkyl or aralkyl group; d represents an integer satisfying the relation $0 \leq d \leq 8$; e represents an integer satisfying the relation $2 \leq e \leq 10$; f represents an integer satisfying the relation $0 \leq f \leq 8$; provided that the relation of $3 \leq d+e+f \leq 10$ is satisfied)

These may be used each alone or two or more species may be used in admixture. Among these siloxanes, from the standpoint of compatibility with (meth)acrylic polymers, phenyl-containing linear siloxanes represented by the following general formula (25) or (26) and cyclic siloxanes represented by the general formula (27) or (28) are preferred.

  (25)

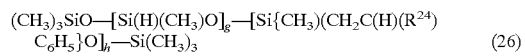  (26)

(in the above formulas, $R^{24}$ represents hydrogen or methyl; g represents an integer satisfying the relation $2 \leq g \leq 100$; h represents an integer satisfying the relation $0 \leq h \leq 100$; $C_6H_5$ signifies a phenyl group)

  (27)

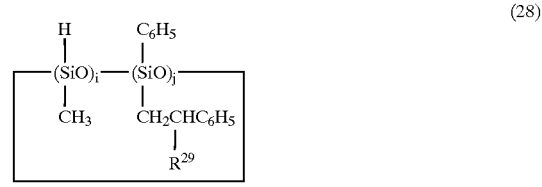  (28)

(wherein $R^{29}$ represents hydrogen or methyl; i represents an integer satisfying the relation $2 \leq i \leq 10$; j represents an integer satisfying the relation $0 \leq j \leq 8$; provided that the relation of $3 \leq i+j \leq 10$ is satisfied; $C_6H_5$ signifies a phenyl group)

The compound having at least 1.1 hydrosilyl groups for use as component (B) includes compounds available on addition-reaction of a hydrosilyl compound represented by any of the general formulas (22) to (28) to a low-molecular-weight compound having two or more alkenyl groups per molecule thereof in such a ratio that some of the hydrosilyl groups will remain intact after the reaction. As the compound having two or more alkenyl groups per molecule, various compounds can be employed. For example, there can be mentioned hydrocarbon compounds such as 1,4-pentadiene, 1,5-hexadiene, 1,6-heptadiene, 1,7-octadiene, 1,8-nonadiene, 1,9-decadiene, etc., ether compounds such as O,O'-diallylbisphenol A, 3,3'-diallylbisphenol A, etc.; ester compounds such as diallyl phthalate, diallyl isophthalate, triallyl trimellitate, tetrallyl pyromellitate, etc.; and carbonate compounds such as diethylene glycol diallyl carbonate and so forth.

By adding said alkenyl group-containing compound gradually dropwise to an excess of the hydrosilyl group-containing compound represented by any of the above general formulas (22) to (28) in the presence of a hydrosilylation catalyst, the objective compound can be obtained. Among species of said compound, the following compound is preferred in view of the availability of starting material, ease of removal of the excess siloxane, and compatibility with the vinyl polymer.

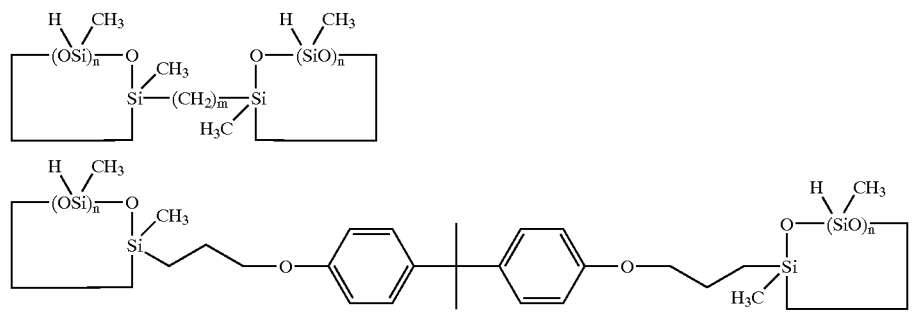

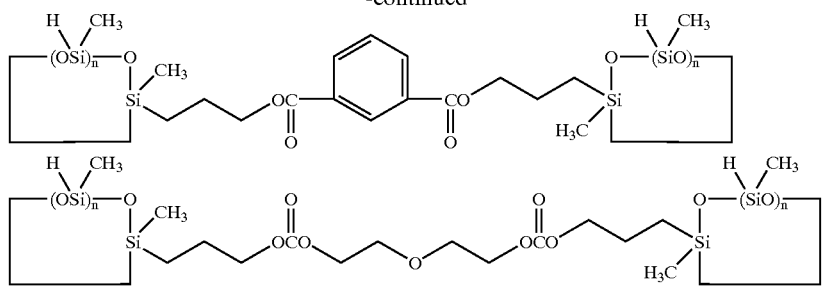

(In the formulae, n represents an integer of 2 to 4, and m represents an integer of 5 to 10)

The vinyl polymer as component (A) and the hydrosilyl group-containing compound as component (B) can be blended in an arbitrary ratio, but from the standpoint of curability, the alkenyl/hydrosilyl molar ratio is preferably in the range of 5 to 0.2, more preferably 2.5 to 0.4. If the molar ratio exceeds 5, curing will be insufficient so that only a cured product having a sticky feel and a low hardness value will be obtained. If the ratio is smaller than 0.2, a substantial proportion of active hydrosilyl groups will remain in the cured product so that cracks and voids may occur to prevent formation of a homogeneous high-strength cured product.

The curing reaction between the vinyl polymer as component (A) and the hydrosilyl group-containing compound as component (B) proceeds as the two components are blended and heated, but in order that the reaction may be expedited, a hydrosilylation catalyst can be added. The hydrosilylation catalyst mentioned just above is not particularly restricted but includes radical initiators such as organic peroxides and azo compounds and transition metal catalysts.

The radical initiator mentioned above is not particularly restricted but includes, among others, dialkyl peroxides such as di-t-butyl peroxide, 2,5-dimethyl-2,5-di(t-butylperoxy) hexane, 2,5-dimethyl-2,5-di(t-butylperoxy)-3-hexyne, dicumyl peroxide, t-butyl cumyl peroxide, α, α'-bis (t-butylperoxy)isopropylbenzene, etc.; diacyl peroxides such as benzoyl peroxide, p-chlorobenzoyl peroxide, m-chlorobenzoyl peroxide, 2,4-dichlorobenzoyl peroxide, lauroyl peroxide, etc.; peroxy acid esters such as t-butylperbenzoate; diperoxycarbonates such as diusopropyl diperoxycarbonate, di-2-ethylhexyl diperoxycarbonate, etc.; and peroxy ketals such as 1,1-di(t-butylperoxy)cyclohexane, 1,1-di(t-butylperoxy) -3,3,5-trimethylcyclohexane and so on.

The transition metal catalyst mentioned above is not particularly restricted but includes, among others, platinum metal, a dispersion of solid platinum in a matrix such as alumina, silica, carbon black or the like, and various platinum compounds such as chloroplatinic acid, a complex of chloroplatinic acid with an alcohol, aldehyde or ketone, platinum-olefin complexes, and platinum(0)-divinyltetramethyldisiloxane complex. As catalysts other than platinum compounds, there can be mentioned RhCl(PPh$_3$)$_3$, RhCl$_3$, RuCl$_3$, IrCl$_3$, FeCl$_3$, AlCl$_3$, PdCl$_2$.H$_2$O, NiCl$_2$ and TiCl$_4$, among others. These catalysts can be used independently or two or more of them may be used in a suitable combination. The amount of use of the catalyst is not particularly restricted but is preferably in the range of $10^{-1}$ to $10^{-8}$ mol per mol of the alkenyl group in component (A), more preferably $10^{-3}$ to $10^{-6}$ mol on the same basis. If the amount is less than $10^{-8}$ mol, the curing reaction will not proceed well. Moreover, since hydrosilylation catalysts in general are expensive and corrosive, a substantial amount of hydrogen gas maybe evolved to cause foaming in the cured product. Therefore, it is preferred to refrain from using more than $10^{-1}$ mol of the catalyst.

The curing temperature is not particularly restricted but is generally 0 to 200° C., preferably 30 to 150° C., more preferably 80 to 150° C. Under this condition, a curable composition can be obtained in a reasonably short time.

<Hydrosilylatable Composition (2)>

As the hydrosilyl group-containing compound as component (B), a hydrosilane compound additionally containing a crosslinkable silyl group can also be used.

The hydrosilane compound additionally having a crosslinkable silyl group is not particularly restricted but typically includes the compound represented by the following general formula (29).

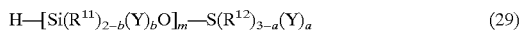
(29)

{wherein $R^{11}$ and $R^{12}$ each represents an alkyl group of 1 to 20 carbon atoms, an aryl group of 6 to 20 carbon atoms, an aralkyl group of 7 to 20 carbon atoms, or a triorganosiloxy group represented by the formula (R')$_3$SiO— (where R' represents a univalent hydrocarbon group of 1 to 20 carbon atoms; the three R' groups may be the same or different); when two or more $R^{11}$ or $R^{12}$ groups are present, they may be the same or different; Y represents a hydroxyl group or a hydrolyzable group and when two or more Y groups are present, they may be the same or different; a represents an integer of 0, 1, 2 or 3; b represents an integer of 0, 1 or 2; m represents an integer of 0 to 19; provided that the relation of a+mb≧1 is satisfied}

The hydrolyzable group includes conventional groups such as hydrogen, alkoxy, acyloxy, ketoximato, amino, amido, aminooxy, mercapto, alkenyloxy, and so forth. Among these, alkoxy, amido and aminooxy are preferred, with alkoxy being particularly preferred in view of mild hydrolyzability and ease of handling.

The number of hydrolyzable groups and/or hydroxyl groups which may be bonded per silicon atom is 1 to 3 and the value of (a+Σb) is preferably within the range of 1 to 5. When two or more hydrolyzable or hydroxyl groups are present in the crosslinkable silyl group, they may be the same or different. The number of silicon atoms forming a crosslinkable silyl group is not less than 1, but in the case of silicon atoms interconnected by siloxane bonding or the like, the number is preferably not larger than 20.

Among such hydrosilane compounds, compounds having a crosslinkable group of the general formula (30) is preferred from the standpoint of availability.

(30)

(wherein $R^{12}$, Y and a are respectively as defined hereinbefore)

Hydrosilylation of the hydrosilylatable composition comprising the above-described hydrosilane compound as component (B) gives a vinyl polymer having a crosslinkable silyl group per molecule.

The vinyl polymer having at least 1.1 crosslinkable silyl groups per molecule undergoes crosslinking to give a cured product. The vinyl polymer having at least 1.1 crosslinkable silyl groups per molecule as obtainable by the production technology described hereinbefore and the curable composition containing said vinyl polymer (curable composition (2)) are also within the scope of the present invention.

The crosslinkable silyl group according to the invention includes groups represented by the following general formula (31):

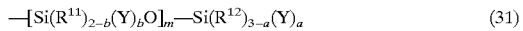

$-[Si(R^{11})_{2-b}(Y)_b O]_m - Si(R^{12})_{3-a}(Y)_a$ (31)

{wherein $R^{11}$ and $R^{12}$ each represents an alkyl group of 1 to 20 carbon atoms, an aryl group of 6 to 20 carbon atoms, an aralkyl group of 7 to 20 carbon atoms, or a triorganosiloxy group represented by the formula $(R')_3SiO-$ (where R' represents a univalent hydrocarbon group of 1 to 20 carbon atoms; the three R' groups may be the same or different); when two or more $R^{11}$ or $R^{12}$ groups are present, they may be the same or different; Y represents a hydroxyl group or a hydrolyzable group and when two or more Y groups are present, they may be the same or different; a represents an integer of 0, 1, 2 or 3; b represents an integer of 0, 1 or 2; m represents an integer of 0 to 19; provided that the relation of $a+mb \geq 1$ is satisfied}

The hydrolyzable group includes conventional groups such as hydrogen, alkoxy, acyloxy, ketoximato, amino, amido, aminooxy, mercapto, alkenyloxy, and so forth. Among these, alkoxy, amido and aminooxy are preferred, with alkoxy being particularly preferred in view of mild hydrolyzability and ease of handling.

The number of hydrolyzable groups and/or hydroxyl groups which may be bonded per silicon atom is 1 to 3 and the value of (a+Σb) is preferably within the range of 1 to 5. When two or more hydrolyzable or hydroxyl groups are present in the crosslinkable silyl group, they may be the same or different. The number of silicon atoms forming a crosslinkable silyl group is not less than 1 but in the case of silicon atoms interconnected by siloxane bonding or the like, the number is preferably not larger than 20. Particularly preferred from availability points of view is a crosslinkable silyl group of the following general formula (32).

$-Si(R^{12})_{3-a}(Y)_a$ (32)

(wherein $R^{10}$, Y and a are respectively as defined hereinbefore)

When the cured product obtained from the crosslinkable silyl group-containing vinyl polymer of the invention is required to have rubber-like properties, in particular, at least one of the crosslinkable silyl groups is preferably located at the molecular chain terminus, for a large inter-crosslink molecular weight may then be provided. More preferably, all the functional groups are located at the molecular chain termini.

The relative amount of the vinyl polymer as component (A) and crosslinkable silyl group-containing hydrosilane compound as component (B) is not particularly restricted but it is preferred to insure that the hydrosilyl group will be more than one equivalent to the alkenyl group.

For accelerating the hydrosilylation reaction, a hydrosilylation catalyst may be added. As the hydrosilylation catalyst, the catalysts mentioned hereinbefore can be employed.

The reaction temperature is not particularly restricted but the reaction is carried out generally at 0 to 200° C., preferably 30 to 150° C., more preferably 80 to 150° C.

Curing of the curable composition (2) maybe effected with or without the aid of a condensation catalyst. The condensation catalyst which can be used includes titanic esters such as tetrabutyl titanate, tetrapropyl titanate, etc.; organotin compounds such as dibutyltin dilaurate, dibutyltin diacetylacetonate, dibutyltin maleate, dibutyltin diacetate, dibutyltin dimethoxide, tin octoate, tin naphthenate; lead octoate; amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 1,3-diazabicyclo(5.4.6)undecene-7, etc. and their carboxylates; the reaction product or mixture of an amine compound with an organotin compound, such as the reaction product or mixture of laurylamine with tin octoate; the low-molecular-weight polyamide resin obtainable from an excess of a polyamine and a polybasic acid; the reaction product of an excess of a polyamine with an epoxy compound; amino group-containing silane coupling agents, and known silanol catalysts such as γ-aminopropyltrimethoxysilane, N-(β-aminoethyl) aminopropylmethyldimethoxysilane, etc. These catalysts may be used each alone or in combination. The amount of use of the catalyst is preferably 0 to 10 weight % based on the crosslinkable silyl group-terminated vinyl polymer. When an alkoxy group is chosen as the hydrolyzable group Y, the polymer by itself shows only a low cure speed so that the use of a curing catalyst is preferred.

<Curable Composition>

For the adjustment of physical characteristics, the above-described curable compositions (1) and (2) are respectively supplemented with various additives, such as flame retardants, aging inhibitors, fillers, plasticizers, physical state modifiers, reactive diluents, tackifiers, storage stability-improving agents, solvents, radical chain terminators, metal sequestering agents, ozone degradation inhibitors, phosphorus-type peroxide decomposing agents, lubricants, pigments, forming agents, photocurable resins and so forth in suitable amounts as necessary. These various additives may each be used one species alone or two or more species together.

Furthermore, since the vinyl polymer is inherently excellent in durability, it is not always necessary to formulate an aging inhibitor. However, the hitherto-known antioxidant, ultraviolet absorber, light stabilizer or the like may be used as needed.

<Filler>

The filler which can be formulated is not particularly restricted but for the purpose of imparting strength and other physical properties, there can be added reinforcing fillers such as finely divided silica, calcium carbonate, talc, titanium dioxide, diatomaceous earth, barium sulfate, carbon black, surface-treatedmicrofine calcium carbonate, fired clay, clay, activated zinc oxide and so forth. These reinforcing fillers may be used each alone or two or more of them may be used in combination. Among said fillers, finely divided silica is preferred and the hydrous silica available from a wet process and the dry silica obtained from a dry process can be employed. Since the composition rich in water tends to undergo side reactions in curing, anhydrous silica is used with particular advantage. Moreover, the anhydrous silica subjected to hydrophobic surface treatment is particularly preferred because it is liable to have free-flowing properties suited to molding. Aside from the above, fillers of low reinforcing power may be used for volume building or adjustment of physical characteristics.

<Plasticizer>

The plasticizer that can be formulated is not particularly restricted but depending on the objective, for example control of physical state or adjustment of physical properties, the following can be selectively employed: phthalic esters such as dibutyl phthalate, diheptyl phthalate, di(2-ethylhexyl) phthalate, butyl benzyl phthalate, etc.; non-aromatic dibasic acid esters such as dioctyl adipate, dioctyl sebacate, dibutyl sebacate, isodecyl succinate, etc.; fatty acid esters such as butyl oleate, methyl acetylricinoleate, etc.; polyalkylene glycol esters such as diethylene glycol dibenzoate, triethylene glycol dibenzoate, pentaerythritol esters, etc.; phosphoric esters such as tricresyl phosphate, tributyl phosphate, etc.; trimellitic esters; polystyrenes such as polystyrene, poly-α-methylstyrene, etc.; polybutadiene, polybutene, polyisobutylene, butadiene-acrylonitrile, polychloroprene; chlorinated paraffins; hydrocarbon oils such as alkyl diphenyls, partially hydrogenated terphenyls, etc.; process oils; polyethers such as polyether polyols, e.g. polyethylene glycol, polypropylene glycol, polytetramethylene glycol, etc., and derivatives thereof as obtainable by conversion of hydroxyl groups to ester groups or ether groups; epoxy plasticizers such as epoxidized soybean oil, benzyl epoxystearate, etc.; polyester plasticizers obtainable from dibasic acids, such as sebasic acid, adipic acid, azelaic acid, phthalic acid, etc., and any of dihydric alcohols, such as ethylene glycol, diethylene glycol, triethylene glycol, propylene glycol, dipropylene glycol, etc.; and vinyl polymers obtainable by polymerizing acrylic plasticizers or other vinyl monomers by various methods. These plasticizers can be used each alone or in combination but it is not always essential to employ such a plasticizer. The plasticizers may be formulated in the stage of polymer production.

<Storage Stability-improving Agent>

The storage stability-improving agent which can be formulated is not particularly restricted as far as it is capable of inhibiting viscosity gains and any remarkable change in curing speed on storage of the composition. Thus, for example, benzothiazole and dimethyl malate can be mentioned.

<Solvent>

The solvent which can be formulated includes aromatic hydrocarbon solvents such as toluene, xylene, etc.; ester solvents such as ethyl acetate, butyl acetate, amyl acetate, Cellosolve acetate, etc.; and ketone solvents such as methyl ethyl ketone, methyl isobutyl ketone, diisobutyl ketone, and so forth. These solvents may be used in the stage of polymer production.

<Tackifier>

The tackifier which can be formulated is not particularly restricted as far as the cured product may be provided with adhesivenes but is preferably a crosslinkable silyl group-containing compound, more preferably a silane coupling agent. As specific examples, there canbe mentioned alkylalkoxysilanes such as methyltrimethoxysilane, dimethyldimethoxysilane, trimethylmathoxysilane, n-propyltrimethoxysilane, etc.; alkylisoprdpenoxysilanes such as dimethyldiisopropenoxysilane, methyltriisopropenoxysilane, etc.; viny type unsaturated group-containing silanes such as vinyltrimethoxysilane, vi.nyldimethylmethoxysilane, viny:Ltriethoxysilane, γ-methacryloyloxypropylmethyldimethoxysilane, γ-acryloyloxypropylmethyltriethoxysilane, etc.; silicone varnishes; and polysiloxanes; among others.

The preferred, among these, are silane coupling agents having both an organic group containing an atom in addition to carbon and hydrogen, such as epoxy, (meth)acryl, isocyanato, isocyanurate, carbamate, amino, mercapto, carboxyl or the like, and a crosslinkable silyl group per molecule. Thus, the isocyanato-containing alkoxysilane includes γ-isocyanatopropyltrimethoxysilane, γ-isocyanatopropyitriethoxysilane, γ-isocyanatopropylmethyldiethoxysdlane, γ-isocyanatopropylmethyldimethoxysilane, etc.; the isocyanurate-containing alkoxysilane includes isocyanuratosilanes such as tris(trimethoxysilyl) isocyanurate, the amino-containing alkoxysilane includes γ-aminopropyltrimethoxysilane, γ-aminopropyltriethoxysilane, γ-aminopropylmethyldimethoxysilane, γaminopropylmethyldiethoxysilane, N-(β-aminoethyl)-γaminopropyitrimethoxysilane, N-(β-aminoethyl)-γaminopropylmethyldimethoxysilane, N-(β-aminoethyl)-γaminopropyltriethoxysilane, N-(β-aminoethyl)-γaminopropylmethyldiethoxysilane, γureidopropyltrimethoxysilane, N-phenyl-γaminopropyltrimcothoxysilane, N-benzyl-γ-aminopropyltrimethoxysilane, N-vinylbenzyl-γ-aminopropyltriethoxysilane, etc.; the mercapto-containing alkoxysilane includes γ-mercaptopropyltrimethoxysilane, γ-mercaptopropyltriethoxysilane, γ-mercaptopropylmethyldimethoxysilane, γ-mercaptopropylmethyldiethoxysilane, etc.; the carboxyl-containing alkoxysilane includes various carboxysilanes such as γ-carboxyethyltriethoxysilane, β-carboxyethylphenylbis(2-methoxyethoxy)silane, N-β-(carboxymethyl)aminoethyl-γ-aminopropyltrimethoxysilane, etc.; the halogen-containing alkoxysilane includes γ-chloropropyltrimethoxysilane and other halogen-containing silanes.

Moreover, derivatives obtainable by modification of the above silane compounds, such as amino-modified silyl polymers, silylated amino polymers, unsaturated aminosilane complexes, phenylamino-long-chain alkylsilanes, aminosilylated silicones, silylated polyesters, etc., can also be used as silane coupling agents.

Among these, more preferred in terms of curability and adhesion are alkoxysilanes having an epoxy group or a (meth)acrylic group per molecule. More specifically, the epoxy-containing alkoxysilane includes γ-glycidoxypropylmethyldimethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, γ-glycidoxypropylmethyldiisopropenoxysilane, etc. and the (meth)acryl-containing alkoxysilane includes γ-methacryloxypropyltrimethoxysilane, γ-methacryloxypropyltriethoxysilane, γ-acryloxypropyltrimethoxysilane, γ-acryloxypropyltriethoxysilane, methacryloxymethyltrimethoxysilane, methacryloxymethyltriethoxysilane, acryloxymethyltrimethoxysilane, acryloxymethyltriethoxysilane, etc. These may be used each alone or two or more of them may be used in combination.

For improved adhesion, a crosslinkable silyl condensation catalyst can be used in combination with the above tackifier. The crosslinkable silyl condensation catalyst includes organotin compounds such as dibutyltin dilaurate, dibutyltin diacetylacetonate, dibutyltin dimethoxide, tin octoate, etc.; organoaluminum compounds such as aluminum acetylacetonate etc.; and organotitanium compounds such as tetraisopropoxytitanium, tetrabutoxytitanium and so forth.

Tackifiers other than silane coupling agents are not particularly restricted but include epoxy resin, phenolic resin, sulfur, alkyl titanates, aromatic polyisocyanates and so forth.

The tackifier is preferably formulated in a proportion of 0.01 to 20 parts by weight relative to 100 parts by weight of the vinyl polymer. At amounts below 0.01 parts by weight, the adhesion-improving effect will be insufficient. On the other hand, if the amount of 20 parts by weight is exceeded, the physical properties of the cured product will be adversely affected. The preferred amount is 0.1 to 10 parts by weight and more preferred amount is 0.5 to 5 parts by weight.

The above adhesion-improving agents may be used each alone or two or more of them may be used in admixture. By adding such an tackifier, the adhesion of the composition to adherends can be improved.

<Molding Technology>

The molding technology for use when the curable composition of the invention is to be used as a shaped product is not particularly restricted but includes a variety of conventional molding methods. For example, casting, compression molding, transfer forming, injection molding, extrusion molding, rotational molding, blow molding, thermoforming, etc. can be mentioned. From the standpoint of automatic continuous production and productivity, injection molding is particularly preferred. For use of the product as gaskets or the like, whichever of the wet type system in which the curable composition is applied to flange surfaces, which are then brought together before curing, and the composition is caused to cure and the dry type system in which the curable composition is caused to cure and then interposed between the flange surfaces can be employed.

<Uses>

The curable composition of the invention can be used in various applications including but not limited to sealants such as architectural elastic sealants and multilayer glass sealants, electrical/electronic parts such as solar cell back sealants, electrical insulation materials such as conductor/cable sheaths, self-adhesives, adhesives, elastic adhesives, coatings, powder coating materials, coating agents, foams, electric/electronic potting materials, film, gaskets, casting compounds, manmade marble, various moldingmaterials, and rust- and water-proofing sealants for end faces (cut sections) of wire-reinforced glass or laminated glass, among others.

The shaped product showing rubber elasticity as obtained from the curable composition of the invention can be used in a broad range of application centered around gaskets and packings. In the automotive field, for instance, it can be used as car body-related parts such as air-tight sealants, anti-vibration glass sealants, and body antidamping materials, particularly as windshield gaskets and door glass gaskets. As chassis parts, it can be used as engine and suspension rubbers with ribration-and sound-proofing functions, particularly as the engine mount rubber. As engine parts, it can be used as hoses for the coolant, fuel supply, exhaust gas control, etc., and engine oil seals, among other uses. Furthermore, it can be used as exhaust gas cleaning equipment parts and brake parts. In the field of household electrical appliances, it can be used as packings, O-rings and belts. Specifically, trimmings, water-proof packings, anti-vibration rubbers, and moth-proof packings for lighting equipment, vibration-and sound-absorption materials and air seals for cleaners; drip-proof covers, water-proof packings, heater packings, electrode packings and safety valve diaphragms for electric water heaters, hoses, water-proof packings for sake warmers, water-proof packings for solenoid valves, steam oven ranges and jar rice cookers, water supply tank packings, water suction valves, water-receiver packings, connecting hoses, belts, incubation heater packings, steam blowout seals and other oil packings for burners, O-rings, drain packings, pressure tubes, air blower tubes, feed and suction packings, damping rubbers, oiling port packings, oil level gage packings, oil supply piping, diagram valves, air supply piping, etc., speaker gaskets, speaker edges, turntable seats, and belt-and-pulley assemblies for sound equipment. Architectural applications include structural gaskets (zipper gaskets), air-film structural roofing materials, water-proofing members, profile-sealing materials, damping materials, sound-proofing materials, setting blocks, and sliding members, among others. In the sporting field, sporting floor materials such as all-weather pavement materials, gymnasium floor materials, etc. and in the area of sport shoes, shoe soles and insoles, etc. and golf balls as balls for ball games can be mentioned. In the damping rubber field, automotive damper rubber, rolling stock damper rubber, aircraft damper rubber and ship side protection materials can be mentioned. In the marine and civil engineering field, structural materials such as rubber-flexible couplings, journals, water-stops, water-proofing sheets, rubber dams, elastic pavement, damping pads, defenders, etc. can be mentioned; as secondary engineering materials, rubber flasks, rubber packers, rubber skirts, sponge mats, mortar hoses, mortar strainers, etc. can be mentioned; and as auxiliary engineering materials, rubber sheets, air hoses, etc. can be mentioned. As safety products, rubber buoys, breakwater materials, etc. can be mentioned. As environmental protection materials, oil fences, silt fences, antifouling materials, marine hoses, dredging hoses, and oil skimmers can be mentioned. Aside from the above, the composition can be used as the plate rubber, mat, form plate and the like.

As the vinyl polymer produced by atom transfer radical polymerization is treated with an oxidizing agent or a reducing agent in accordance with the present invention, hydrosilylation activity is increased so that the polymer can be used as a component of a hydrosilylatable composition.

EXAMPLES

The following examples are illustrative and by no means limitative of the present invention.

Production Example 1

Process for Producing an Alkenyl-terminated Vinyl Polymer

A 100 mL round-bottomed flask equipped with a reflux condenser tube and stirrer was charged with CuBr (0.375 g, 2.62 mmol) followed by nitrogen purging. Then, acetonitrile (5.00 is mL) was added and the mixture was stirred in an oil bath at 80° C. for 30 minutes. Then, butyl acrylate (50.0 mL, 0.349 mol) and diethyl 2,5-dibromoadipate (0.784 g, 2.18 mmol) were added there to and the whole mixture was stirred at80° C for 25 minutes. Then, pentamethyldiethylenetriamine (0.0228 mL, 1.09 mmol) (hereinafter briefly as triamine) was added and the reaction was started. After 10 minutes of reaction, 0.0228 mL of triamine was further added and at 15 minutes and onward the stirring was continued in an oil bath controlled at 95° C. After 70 minutes, 0.0228 mL of triamine was further added. At 150 minutes after the start of reaction, 1,7-octadiene (12.9 mL, 0.0872 mol) was added and the stirring was further continued for 360 minutes. At 90 minutes after the addition of octadiene, 0.0456 mL of triamine was further added. Then, 0.0456 mL and 0.0912 mL of triamine were added at 180 minutes and 270 minutes, respectively.

The reaction mixture was diluted with 3 volumes of toluene and the solid fraction was filtered off to give a solution containing an alkenyl group-terminated polymer (polymer [1]) solution (polymer solution [1']). By GPC analysis (polystyrene equivalence method), the polymer [1] was found to have a number average molecular weight of 30600 and a molecular weight distribution of 1.63. The average number of alkenyl groups introduced per molecule of the polymer as determined by $^1$H NMR analysis was 5.5.

Production Example 2

A 50 L autoclave equipped with a reflux condenser and stirrer was charged with a suspension of CuBr (251.82 g, 1.76 mol) in acetonitrile (2640 g) and, after nitrogen sealing, the suspension was stirred at 65° C. for 30 minutes. Then, butyl acrylate (6.0 kg), diethyl 2,5-dibromoadipate (526.70 g, 1.46 mol), acetonitrile (695 g) and pentamethyldiethylenetriamine (12.0 mL, 58.5 mmol) (hereinafter briefly as triamine) were added and the reaction was started. Under stirring at 80° C., butyl acrylate (24.0 kg) was continuously added dropwise. In the course of dropwise addition of butyl acrylate, a further amount of triamine (36.0 mL, 176mmol) was added. After heating and stirring at 80° C., 1,7-octadiene (6.448 kg) and triamine (120.0 mL, 585 mmol) were added and the mixture was further stirred under heating at 80° C. for 4 hours. Thereafter, the heating and stirring were stopped for a while and a further amount of triamine (80.0 mL, 390 mmol) was added and the stirring under heating was carried out at 90° C. for 4 hours to give a polymer [2]-containing reaction mixture (polymerization reaction mixture [2']).

As assayed by GPC analysis (polystyrene equivalence method), this polymer [2] had a number average molecular weight of 23600 and a molecular weight distribution of 1.21. The average number of alkenyl groups introduced per molecule of the polymer as determined by $^1$H NMR analysis was 2.9.

Production Example 3

Process for Producing an Alkenyl-terminated Vinyl Polymer

A 100 mL round-bottomed flask equipped with a reflux condenser tube and stirrer was charged with CuBr (0.375 g, 2.62 mmol) followed by nitrogen purging. Then, acetonitrile (5.00 mL) was added and the mixture was stirred in an oil bath at 70° C. for 15 minutes. Then, butyl acrylate (50.0 mL, 0.349 mol) and diethyl 2,5-dibromoadipate (0.784 g, 2.18 mmol) were added and the whole mixture was stirred at 70° C. for 40 minutes. To this mixture was added triamine (0.0228 mL, 1.09 mmol), and the reaction was started. Then, after 3, 15 and 30 minutes, 0.0228 mL portions of triamine were further added. At 195 minutes after start of the reaction, 1,7-octadiene (12.9 mL, 0.0872 mmol) was added and the mixture was further stirred in an oil bath maintained at 100° C. for 240 minutes.

The reaction mixture was diluted with 9 volumes of toluene and the solid fraction was filtered off to give an alkenyl group-terminated polymer (polymer [3])-containing solution (polymer solution [3']). As analyzed by GPC (polystyrene equivalence method), this polymer [3] had a number average molecular weight of 22400 and a molecular weight distribution of 1.22. The average number of alkenyl groups introduced per polymer molecule as determined by $^1$H NMR analysis was 1.5.

The polymer solutions [1'] to [3'] obtained in Production Example 1 to 3 were respectively purified with the oxidizing agent or reducing agent shown in Table 1 or 2.

Example 1

To 15 mL of polymer solution [1'] was added sodium percarbonate (1.00 g; product of Mitsubishi Gas Chemical; powders), and the mixture was stirred at room temperature for 3 hours. After the solid fraction was filtered off, the toluene was distilled off to give a vinyl polymer. Using the polymer thus obtained, the residual copper was determined. The result is shown in Table 1.

Comparative Example 1

Polymer solution [1'], 15 mL, was allowed to stand at room temperature and then filtered and the toluene was distilled off as in Example 1 to give a vinyl polymer. The residual copper in the polymer thus obtained was determined. The result is shown in Table 1.

Example 2

To 40 mL of polymer solution [2'] was added sodium percarbonate (2.00 g; product of Mitsubishi Gas Chemical; powders), and the mixture was stirred at room temperature for 3 hours. The solid fraction was filtered off and the toluene was distilled off to give a vinyl polymer. Using the polymer thus obtained, gelation time and residual copper were determined. The results are shown in Table 1.

Comparative Example 2

Polymer solution [2'], 40 ml, was allowed to stand at room temperature. The solution was then filtered and the toluene was distilled off as in Example 2 to give a vinyl polymer. The residual copper in this polymer was determined. The result is shown in Table 1.

Example 3

Polymer solution [3'], 50 mL, was stirred at room temperature for 8 hours while air was bubbled through the solution. The solid fraction was separated by filtration and the toluene was distilled off to give a vinyl polymer. The residual copper in the polymer was determined. The result is shown in Table 1.

Comparative Example 3

Polymer solution [3'], 50 mL, was allowed to stand at room temperature and the solid fraction was centrifugally precipitated. From the supernatant, toluene was distilled off to give a vinyl polymer. The residual copper in the polymer thus obtained was determined. The result is shown in Table 1.

Example 4

To 15 mL of polymer solution [1'] was added Superlite C (1.00 g; product of Mitsubishi Gas Chemical; sodium formaldehyde sulfoxylate; powders), and the mixture was stirred at room temperature for 3 hours. The solid fraction was filtered off and the toluene was distilled off to give a vinyl polymer. The residual copper in the polymer was determined. The result is shown in Table 2.

Comparative Example 4

Polymer solution [1'], 15 mL, was allowed to stand at room temperature. Then, the solution was filtered and the toluene was distilled off as in Example 1 to give a vinyl polymer. The residual copper in the polymer was determined. The result is shown in Table 2.

Example 5

To 40 mL of polymer solution [2'] was added Superlite C (2.00 g; product of Mitsubishi Gas Chemical; sodium formaldehyde sulfoxylate; powders), and the mixture was stirred at room temperature for 3 hours. The solid fraction was filtered off and the toluene was distilled off to give a vinyl polymer. Using this polymer, gelation time and residual copper were determined. The results are shown in Table 2.

Comparative Example 5

Polymer solution [2'], 40 mL, was allowed to stand at room temperature. The solution was then filtered and the toluene was distilled off as in Example 2 to give a vinyl polymer. Using this polymer, gelation time and residual copper were determined. The results are shown in Table 2.

Quantitative Determination of Copper

The polymer was mixed with super-high purity nitric acid and super-high purity sulfuric acid and subjected to microwave decomposition. Using an ICP mass spectrometer (manufactured by Yokogawa Analytical Systems; HP-4500), the residual copper in the decomposition product was assayed to determine the residual copper in the polymer.

Curing Test

The polymer was manually blended with a linear polymethylsiloxane containing an average of five hydrosilyl groups and an average of five a-methylstyrene residues (specifically, 2-phenylpropyl group, 1-methyl-1-phenylethyl group) (Si—H value: 3.70 mmol/g) and a solution of platinum (0)-1,1,3,3-tetramethyl-1,3-divinyldisiloxane complex in xylene (platinum concentration $1.3 \times 10^{-5}$ mmol/$\mu$l) at room temperature to give a composition. About 0.1 g of this composition was heated with stirring in atmospheric air on a hot plate at 130° C. and the time to gelation (gelation time, in seconds) was measured.

The linear polymethylsiloxane mentioned above was used in such an amount as to give an alkenyl/hydrosilyl molar ratio of 1/1.5. The amounts of the platinum catalyst as shown in Tables 1 and 2 are the equivalent amounts (molar ratios) of the platinum catalyst relative to the alkenyl group.

TABLE 1

| | Polymer solution | Agent | Cu (ppm) | Gelation time (sec.) (The amount of plutinum catalyst = $2 \times 10^{-3}$ equv.) | Gelation time (sec.) (The amount of plutinum catalyst = $4 \times 10^{-3}$ equv.) | Gelation time (sec.) (The amount of plutinum catalyst = $2 \times 10^{-2}$ equv.) | Color of polymer |
|---|---|---|---|---|---|---|---|
| Ex. 1 | Production method 1 | Na percarbonate | 14.2 | — | — | — | blown |
| Compar. Ex. 1 | Production method 1 | Not treated | 176 | — | — | — | light verdant green |
| Ex. 2 | Production method 2 | Na percarbonate | 13.6 | 51 | 15 | — | light blown |
| Compar. Ex. 2 | Production method 2 | Not treated | 120 | >120 | >120 | 51 | blown |
| Ex. 3 | Production method 3 | Air valve | 6.3 | — | — | — | light yellow |
| Compar. Ex. 3 | Production method 3 | Not treated | 170 | — | — | — | yellow |

\* ">120" means "not cured at 120 sec." in the column "gelation time".

TABLE 2

| | Polymer solution | Agent | Cu (ppm) | Gelation time (sec.) (The amount of plutinum catalyst = $1.2 \times 10^{-2}$ equv.) | Gelation time (sec.) (The amount of plutinum catalyst = $2 \times 10^{-2}$ equv.) | Color of polymer |
|---|---|---|---|---|---|---|
| Ex. 4 | Production method 1 | Superlite C | 18.0 | — | — | colorless |
| Compar. Ex. 4 | Production method 1 | Not treated | 176 | — | — | blown |
| Ex. 5 | Production method 2 | Superlite C | 45.4 | 54 | — | light blown |
| Compar. Ex. 5 | Production method 2 | Not treated | 120 | >120 | 51 | blown |

\* ">120" means "not cured at 120 sec." in the column "gelation time".

In any of Examples 1 to 5, the treatment with an oxidizing agent or a reducing agent resulted in a reduction in the copper content of the polymer and an attenuation of polymer discoloration. Moreover, in Examples 2 and 4, the amount of a platinum catalyst that is necessary for gelation which is an indicator of hydrosilylation activity was decreased after the treatment with an oxidizing agent or a reducing agent.

What is claimed is:

1. A method for increasing the hydrosilylation activity of a vinyl polymer having at least one reactive functional group per molecule, comprising contacting said vinyl polymer into contact with oxygen or sodium percarbonate.

2. The method according to claim 1,
wherein said vinyl polymer is obtained by atom transfer radical polymerization of a vinyl monomer using a transition metal complex as a polymerization catalyst.

3. The method according to claim 1,
wherein said reactive functional group is located at the molecular chain terminus of said vinyl polymer.

4. The method according to claim 1,
wherein said vinyl polymer comprises an alkenyl group at the molecular chain terminus, and is obtained by adding a compound having two or more sparingly polymerizable carbon-carbon double bonds during polymerization or after completion of polymerization in an atom transfer radical polymerization system.

5. The method according to claim 1,
wherein said vinyl polymer is a (meth)acrylic polymer.

6. The method according to claim 1,
wherein said vinyl polymer has a number average molecular weight of 500 to 100000.

7. The method according to claim 1,
wherein said vinyl polymer has a molecular weight distribution value of less than 1.8.

8. The method according to claim 1,
wherein the center metal of the transition metal catalyst belongs to group 8, group 9, group 10 or group 11 of the periodic table of the elements.

9. The method according to claim 1,
wherein the center metal of the transition metal catalyst is iron, nickel, ruthenium or copper.

10. The method according to claim 1,
wherein a polyamine compound is used as a catalyst ligand for atom transfer radical polymerization.

11. The method according to claim 1,
wherein said reactive functional group is a functional group selected from the group consisting of alkenyl, crosslinkable silyl, hydroxyl, epoxy, amino and amido.

* * * * *

UNITED STATES PATENT AND TRADEMARK OFFICE
CERTIFICATE OF CORRECTION

PATENT NO. : 6,794,461 B2
DATED : September 21, 2004
INVENTOR(S) : Fujita et al.

It is certified that error appears in the above-identified patent and that said Letters Patent is hereby corrected as shown below:

<u>Column 36,</u>
Lines 66 and 67 change "contacting said vinyl polymer into contact with oxygen or sodium percarbonate." to be -- contacting said vinyl polymer with oxygen or sodium percarbonate, wherein said vinyl polymer is obtained by atom transfer radical polymerization. --

Signed and Sealed this

Twenty-second Day of March, 2005

JON W. DUDAS
*Director of the United States Patent and Trademark Office*